United States Patent [19]

Kucera et al.

[11] Patent Number: 4,864,501
[45] Date of Patent: Sep. 5, 1989

[54] WORD ANNOTATION SYSTEM

[75] Inventors: Henry Kucera, Providence, R.I.; Alwin B. Carus, Newton, Mass.

[73] Assignee: Houghton Mifflin Company, Boston, Mass.

[21] Appl. No.: 106,224

[22] Filed: Oct. 7, 1987

[51] Int. Cl.⁴ .............................................. G06K 9/00
[52] U.S. Cl. .................................... 364/419; 364/900
[58] Field of Search ...................... 364/200, 900, 419; 382/57, 36, 37, 38

[56] References Cited

U.S. PATENT DOCUMENTS

| | | | |
|---|---|---|---|
| 4,724,523 | 2/1988 | Kucera | 364/419 |
| 4,742,481 | 5/1988 | Yoshimura | 364/419 |
| 4,760,528 | 7/1988 | Levin | 364/419 |
| 4,771,385 | 9/1988 | Egami | 364/419 |
| 4,771,401 | 9/1988 | Kaufman | 364/419 |

Primary Examiner—Michael R. Fleming
Attorney, Agent, or Firm—Lahive & Cockfield

[57] ABSTRACT

A system for annotating digitally encoded text includes a dictionary of base forms. For each base form, a first set of tags represents possible grammatical and syntactic properties of the word, and may encode inflectional paradigms of the base form, or feature agreement behavior and special processing. If a text word is not found in the dictionary, an inflectional analyzer looks up one or more base forms derived from the word, and if found, and annotates them with their dictionary tags. A morphological analyzer assigns tags to words not retrieved in the dictionary. The morphological analyzer recognizes words formed by prefixation and suffixation, as well as proper nouns, ordinals, idiomatic expressions, and certain classes of character strings. The tagged words of a sentence are then processed to parse the sentence.

14 Claims, 10 Drawing Sheets

| | | |
|---|---|---|
| . | SENTENCE CLOSER (PUNCTUATION TAG) | 01 |
| ( | OPEN PARENTHESIS (PUNCTUATION TAG) | 02 |
| * | "NOT" (ADVERBIAL TAG) | 03 |
| ) | CLOSE PARENTHESIS (PUNCTUATION TAG) | 04 |
| ; | SEMI-COLON (PUNCTUATION TAG) | 05 |
| - | DASH (PUNCTUATION TAG) | 06 |
| , | COMMA (PUNCTUATION TAG) | 07 |
| : | COLON (PUNCTUATION TAG) | 08 |
| ABL | PRE-QUALIFIER (PRE-NOMINAL TAG) | 09 |
| ABN | PRE-QUANTIFIER (PRE-NOMINAL TAG) | 10 |
| ABX | PRE-QUANTIFIER/DOUBLE CONJUNCTION (PRE-NOMINAL TAG) | 11 |
| AP | POST-DETERMINER (PRE-NOMINAL TAG) | 12 |
| AT | ARTICLE (PRE-NOMINAL TAG) | 13 |
| BED | "WERE" (VERBAL TAG) <F> | 14 |
| BEDZ | "WAS" (VERBAL TAG) <F> | 15 |
| BEG | "BEING" (VERBAL TAG) <N> | 16 |
| BEI | "BE"-BASE FORM (VERBAL TAG) <N> | 17 |
| BEM | "AM" (VERBAL TAG) <F> | 18 |
| BEN | "BEEN" (VERBAL TAG) <N> | 19 |
| BER | "ARE" (VERBAL TAG) <F> | 20 |
| BEZ | "IS" (VERBAL TAG) <F> | 21 |
| CC | COORDINATING CONJUNCTION (SENTENTIAL TAG) | 22 |
| CD | CARDINAL NUMBER (PRE-NOMINAL TAG) | 23 |
| CS | SUBORDINATING CONJUNCTION (SENTENTIAL TAG) | 24 |
| DOD | "DID" (VERBAL TAG) <F> | 25 |
| DOG | "DOING" (VERBAL TAG) <N> | 26 |
| DOI | "DO"-BASE FORM (VERBAL TAG) <N> | 27 |
| DON | "DONE" (VERBAL TAG) <N> | 28 |
| DOP | "DO" (VERBAL TAG) <N> | 29 |
| DOZ | "DOES" (VERBAL TAG) <F> | 30 |
| DT | SINGULAR DETERMINER (PRE-NOMINAL TAG) | 31 |
| DTI | SINGULAR/PLURAL DETERMINER (PRE-NOMINAL TAG) | 32 |
| DTS | PLURAL DETERMINER (PRE-NOMINAL TAG) | 33 |
| DTX | DETERMINER/DOUBLE CONJUNCTION (PRE-NOMINAL TAG) | 34 |
| EX | EXISTENTIAL "THERE" (NOMINAL TAG) <P> | 35 |
| HVD | "HAD"; PAST TENSE (VERBAL TAG) <F> | 36 |
| HVG | "HAVING" (VERBAL TAG) <N> | 37 |
| HVI | "HAVE"-BASE FORM (VERBAL TAG) <N> | 38 |
| HVN | "HAD"; PAST PARTICIPLE (VERBAL TAG) <N> | 39 |
| HVP | "HAVE" (VERBAL TAG) <N> | 40 |
| HVZ | "HAS" (VERBAL TAG) <F> | 41 |
| IN | PREPOSITION (SENTENTIAL TAG) | 42 |
| JJ | ADJECTIVE (PRE-NOMINAL TAG) | 43 |
| JJR | COMPARATIVE ADJECTIVE (PRE-NOMINAL TAG) | 44 |
| JJS | SUPERLATIVE ADJECTIVE (PRE-NOMINAL TAG) | 45 |
| JJT | SEMANTIC SUPERLATIVE (PRE-NOMINAL TAG) | 46 |
| MD | MODAL AUXILARY (VERBAL TAG) <F> | 47 |

*FIG. 2*
(01 THRU 47)

| | | |
|---|---|---|
| NN | SINGULAR COMMON NOUN - BASE FORM (NOMINAL TAG) <N> | 48 |
| NN$ | POSSESSIVE SINGULAR COMMON NOUN (PRE-NOMINAL TAG) | 49 |
| NNS | PLURAL COMMON NOUN (NOMINAL TAG) <N> | 50 |
| NNS$ | POSSESSIVE PLURAL COMMON NOUN (PRE-NOMINAL TAG) | 51 |
| NNX | NON-POSSESSIVE COMMON NOUN - BASE FORM (NOMINAL TAG) <N> | 52 |
| NP | SINGULAR PROPER NOUN - BASE FORM (NOMINAL TAG) <N> | 53 |
| NP$ | POSSESSIVE SINGULAR PROPER NOUN (PRE-NOMINAL TAG) | 54 |
| NPS | PLURAL PROPER NOUN (NOMINAL TAG) <N> | 55 |
| NPS$ | POSSESSIVE PLURAL PROPER NOUN (PRE-NOMINAL TAG) | 56 |
| NR | SINGULAR ADVERBIAL NOUN - BASE FORM (NOMINAL TAG) <P> | 57 |
| NR$ | POSSESSIVE SINGULAR ADVERBIAL NOUN (PRE-NOMINAL TAG) | 58 |
| NRS | PLURAL ADVERBIAL NOUN (NOMINAL TAG) <P> | 59 |
| NRS$ | POSSESSIVE PLURAL ADVERBIAL NOUN (PRE-NOMINAL TAG) | 60 |
| OD | ORDINAL NUMBER (PRE-NOMINAL TAG) | 61 |
| PN | NOMINAL PRONOUN (NOMINAL TAG) <P> | 62 |
| PN$ | POSSESSIVE NOMINAL PRONOUN (PRE-NOMINAL TAG) | 63 |
| PP$ | POSSESSIVE PRONOUN (PRE-NOMINAL TAG) | 64 |
| PP$$ | SECOND POSSESSIVE PRONOUN (NOMINAL TAG) <P> | 65 |
| PPL | SINGULAR REFLEXIVE PRONOUN (NOMINAL TAG) <P> | 66 |
| PPLS | PLURAL REFLEXIVE PRONOUN (NOMINAL TAG) <P> | 67 |
| PPO | OBJECTIVE PERSONAL PRONOUN (NOMINAL TAG) <P> | 68 |
| PPS | THIRD PERSON NOMINATIVE PERSONAL PRONOUN (NOMINAL TAG <P> | 69 |
| PPSS | NON-THIRD PERSON NOMINATIVE PERSONAL PRONOUN (NOMINAL TAG) <P> | 70 |
| PPX | NON-POSSESSIVE PERSONAL PRONOUN (NOMINAL TAG) <P> | 71 |
| QL | QUALIFIER (PRE-NOMINAL TAG) | 72 |
| QLP | POST-QUALIFIER (PRE-NOMINAL TAG) | 73 |
| RB | ADVERB (ADVERBIAL TAG) | 74 |
| RBR | COMPARATIVE ADVERB (ADVERBIAL TAG) | 75 |
| RBT | SUPERLATIVE ADVERB (ADVERBIAL TAG) | 76 |
| RN | NOMINAL ADVERB (ADVERBIAL TAG) | 77 |
| RP | ADVERB/PARTICLE (ADVERBIAL TAG) | 78 |
| TO | INFINITIVAL "TO" (VERBAL TAG) <(IN)> | 79 |
| UH | EXCLAMATION (SENTENTIAL TAG) | 80 |
| VBD | VERB PAST TENSE FORM (VERBAL TAG) <F> | 81 |
| VBG | VERB PRESENT PARTICIPLE (VERBAL TAG) <N> | 82 |
| VBI | VERB INFINITIVE - BASE FORM (VERBAL TAG) <N> | 83 |
| VBN | VERB PAST PARTICIPLE (VERBAL TAG) <N> | 84 |
| VBP | VERB NON-THIRD PERSON SINGULAR, PRESENT TENSE (VERBAL TAG) <N> | 85 |
| VBZ | VERB THIRD-PERSON SINGULAR, PRESENT TENSE (VERBAL TAG) <F> | 86 |
| WDT | WH-DETERMINER (PRE-NOMINAL TAG) | 87 |
| WP$ | PERSONAL WH-PRONOUN (PRE-NOMINAL TAG) | 88 |
| WPO | OBJECTIVE WH-PRONOUN (NOMINAL TAG) <P> | 89 |
| WPS | NOMINATIVE WH-PRONOUN (NOMINAL TAG) <P> | 90 |
| WQL | WH-QUALIFIER (PRE-NOMINAL TAG) | 91 |
| WRB | WH-ADVERB (ADVERBIAL TAG) | 92 |
| XX | - PARSER INTERNAL · NO TAG ASSIGNED - | 93 |
| ZZZZ | END-OF-FILE MARKER | 94 |

*FIG. 2*

(48 THRU 94)

EXAMPLES OF "NORMAL" MAIN DICTIONARY RECORDS

| 1/ | |26 | |30 | |34 | |80 |
|---|---|---|---|---|
| . | | | . | |
| ! | | | . | |
| a | | | AT | |
| aback | | | RB | |
| abandonment | N1 | | | |
| abase | | V1 | | |
| abasement | N1 | | | |
| abashed | | | JJ | |
| as | | | CS IN QL RB | |
| back | N1 | V1 | JJ RB | |
| backing | N1 | | | |

FIG. 3A

EXAMPLES OF "EXCEPTION" MAIN DICTIONARY RECORDS

| 1/ | |26 | |30 | |34 | |80 |
|---|---|---|---|---|
| adieu | N1s | | (NN: adieus/adieux) | $ |
| adieus | N4p | | (NNS: adieu) | $ |
| adieux | N4p | | (NNS: adieu) | $ |
| am | | | BEM (xref: be) | $ |
| are | | | BER (xref: be) | $ |
| arise | | | (VBI-1: arose/arisen) | $ |
| arisen | | | (VBN: arise) | $ |
| arose | | | (VBD: arise) | $ |
| ate | | | (VBD: eat) | $ |
| awoke | | | JJ RB (VBI-1: awoke/awoken) | $ |
| awoke | | | (VBD: awake) | $ |
| awoken | | | (VBN: awake) | $ |
| bacilli | | | (NNS: bacillus) | $ |
| bacillus | | | (NN: bacilli) | $ |
| bade | | | (VBX: bid) | $ |
| base | | | (NN: bases) | $ |
| bases | | | (NNS: base/basis) | $ |
| basis | | | (NN: bases) | $ |
| be | | | BEI (xref: is) | $ |
| bear | | | (VBI-1: bore/borne) | $ |

FIG. 3B

EXAMPLES OF "CONTRACTION" MAIN DICTIONARY RECORDS

| |1 | |26 | |36 | |46 | |56 | |66 | |80 |
|---|---|---|---|---|---|---|
| 'tis | PPS+BEZ | | | | | + |
| ain't | BEM+* | BER+* | BEZ+* | HVP+* | HVZ+* | + |
| aren't | BER+* | | | | | + |
| can't | MD+* | | | | | + |
| cannot | MD+* | | | | | + |
| could've | MD+HV! | | | | | + |
| couldn't | MD+* | | | | | + |
| didn't | DOD+* | | | | | + |
| doesn't | DOZ+* | | | | | + |
| don't | DOP+* | | | | | + |

*FIG. 3C*

GRAMMATICAL ANNOTATION OF TEST SENTENCE

| Loc.: | Word: | Tag String: |
|---|---|---|
| 1: | John | NP |
| 2: | wants | NNS (BF=want) VBZ (=BF) |
| 3: | to | IN TO |
| 4: | sell | VBI VBP |
| 5: | the | AT |
| 6: | new | JJ |
| 7: | metropolitan | JJ |
| 8: | zoo | NN |
| 9: | all | ABN QL RB |
| 10: | his | PP$ PP$$ |
| 11: | cleverly | RB |
| 12: | trained | VBN (BF=train) VBD (=BF) |
| 13: | and | CC |
| 14: | brilliantly | QL RB |
| 15: | plumaged | JJ |
| 16: | parakeets | NNS (BF=parakeet) |
| 17: | . | . |

*FIG. 5*

LIST OF MAJOR CLASS HEADERS FOR TAGS

| Class | Description | Tags |
|-------|-------------|------|
| AB | pre-qualifiers and pre-quantifiers | 3 |
| AP | post determiner | 1 |
| AT | article | 1 |
| BE | forms of the verb "to be" | 8 |
| CC | coordinating conjunction | 1 |
| CD | cardinal number | 1 |
| CS | subordinating conjunction | 1 |
| DO | forms of the verb "to do" | 6 |
| DT | determiners | 4 |
| EX | existential "there" | 1 |
| HV | forms of the verb "to have" | 6 |
| IN | preposition | 1 |
| JJ | adjectives | 4 |
| MD | modal auxiliary | 1 |
| NN | common nouns | 5 |
| NP | proper nouns | 4 |
| NR | adverbial nouns | 4 |
| OD | ordinal number | 1 |
| PN | nominal pronouns | 2 |
| PP | personal pronouns | 8 |
| QL | qualifiers | 2 |
| RB | adverbs | 3 |
| RN | nominal adverb | 1 |
| RP | adverb/particle | 1 |
| TO | infinitival "to" | 1 |
| UH | exclamation | 1 |
| VB | verbs | 6 |
| WD | wh-determiner | 1 |
| WP | personal wh-pronouns | 3 |
| WQ | wh-qualifier | 1 |
| WR | wh-adverb | 1 |
| XX | none of the above (GCS-internal only) | 1 |

*FIG. 4*

WORD ANNOTATION SYSTEM

The present invention relates to automated language analysis systems, and relates to such systems embodied in a computer for receiving digitally encoded text composed in a natural language, and using a stored dictionary of words and an analysis program to analyze the encoded text and to identify errors. In particular, it relates to systems for the grammatical analysis of encoded text.

In recent years a number of systems have been developed for the automated recognition of syntactic information. A survey of some systems appears in the textbook of Winograd, *Language as a Cognitive Process—Syntax* (ISBN 0-201-08571-2 v. 1). at pages 357-361 and pages 390-403. As a rule, although a number of theoretical linguistic formalisms have been developed to identify correct grammatical constructions, the practical construction of grammatical analyzing devices has proven difficult. Because the number of combinations of possible parts of speech for a string of words escalates exponentially with string length, syntax-recognizing systems have in general been limited to operating on text having a small, well-defined vocabulary, or to operating on more general text but dealing with a limited range of syntactic features. Extensions of either vocabulary or syntactic range require increasingly complex structures and an increasing number of special recognition rules, which would make a system large or too unwieldy for commercial implementation on commonly available computing systems. Moreover, the automated grammatical systems which have been designed are special processors, in that they are not adapted to conventional word processing or computer-aided publishing functions. For example, such systems may require that their input text be at least sufficiently pre-edited so that it is both correctly spelled and grammatically well formed. Text having a misspelling, a wrong word such as a homonym, a compound word, or even a simple syntax error may render an input sentence unanalyzable.

OBJECTS AND SUMMARY OF THE INVENTION

It is an object of the present invention to provide an improved device for the grammatical analysis of digitally encoded natural language text.

It is another object of the invention to provide a digital text analyzer for assigning tags indicative of syntactic or inflectional features of the word to each word of a digitally encoded text.

It is a further object of the invention to provide a grammatical analyser which accepts as an input unedited text material having misspellings and vocabulary errors.

These and other features of the invention are obtained in an apparatus for the grammatical analysis of digitally encoded text material having a stored dictionary wherein each entry represents a word together with tags indicative of possible syntactic and inflectional features of the word. A sentence of digitally encoded text is passed to a text annotator, which operates on the words of the sentence to annotate each word with a sequence of possible tags for the word. The tag set serves as an input to a grammar processor which operates on the tag sets to identify basic grammatical units such as noun phrases and simple predicates, and to process the sentence to determine the parse of the sentence.

In a preferred embodiment, the text annotator receives a sentence of text and uses a look-up procedure to annotate each word of the sentence with tags and data codes from the dictionary. The dictionary may also include data codes representative of features such as gender and number requiring agreement among words. This information goes into a word record and is used to select proper constructions during later processing. In a preferred embodiment, the annotator includes a morphological analyzer, which recognizes prefixes, suffixes and other structural attributes of words to identify certain classes of words which are not found in the stored dictionary. For such a word, the analyser creates a provisional dictionary entry with appropriate tags so that grammatical processing proceeds as though the word were in the database.

When a sentence has been annotated with tags, preferably a single most likely tag is identified for each word. The annotated sentence is then parsed by a parsing component which may, for example, apply templates and transformation rules to determine a grammatically correct parse of the sentence, and also to detect and suggest corrections for errors. The other tags assigned by the annotator may be checked if the parser determines that the designated tag is inconsistent with a correct parse.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings.

BRIEF DESCRIPTION OF THE DRAWINGS

FIG. 2 is a listing of system tags in an illustrative embodiment;

FIGS. 3A, 3B, 3C are samples of dictionary records;

FIG. 4 is a listing of major classes of tags with corresponding codes;

FIG. 5 is a representative text sentence annotated with its dictionary tags;

DETAILED DESCRIPTION OF THE DRAWINGS

Figure 1:
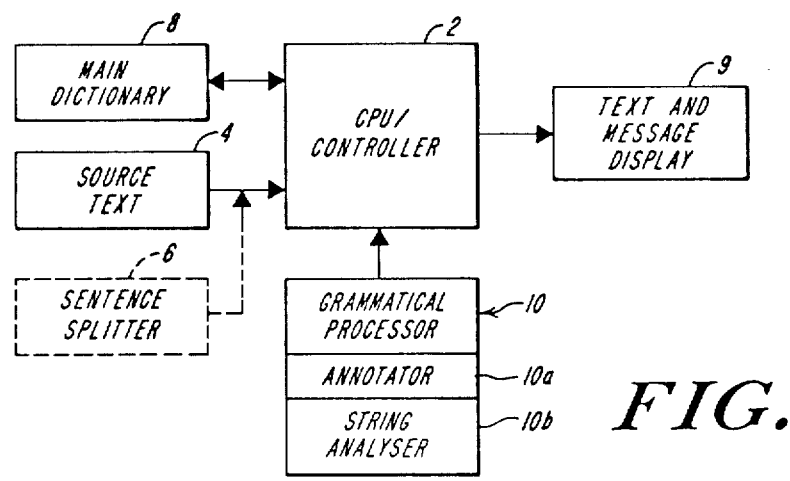
FIG. 1 is a block diagram of a system according to the present invention.

FIG. 1 shows a block diagram of a grammatical annotator according to the present invention having a CPU/controller 2 which may, for example, be a general purpose computer such as a micro- or mini- computer having storage and random access memory of at least several megabytes. The illustrated system is adapted to provide annotated text to a sentence parser. The computer receives input text 4, e.g., from keyboard entry, a communications link, or a data storage device, and, if necessary, runs a sentence splitter 6 which partitions the text into sentences for grammatical analysis. Alternatively, the system may receive as input discrete sentences of text or encoded text with sentence boundary markers inserted. Sentence splitting per se is known in the art, and is used, for example, in commercially available systems for deriving word-per-sentence and similar statistical information in computerized readability analysis systems. A suitable sentence splitter is disclosed in the copending patent application of Henry Kucera, Rachael Sokolowski and Jacqueline Russom filed June 6, 1986 as Ser. No. 872,094 entitled Method and Apparatus for Text Analysis.

The controller 2 then passes the text words to a grammatical annotator 10 which annotates each word of the sentence, primarily by reference to a stored word dictionary 8, as discussed further below, so as to produce an annotated sentence structure. The annotated sentence, or partial annotations thereof and error messages or "prompts" are displayed on display 9.

According to one aspect of the invention, the dictionary includes a record for each word. The record contains a list of "tags", each tag encoding a syntactic or inflectional property of the word. If the annotated text is to be grammatically processed, the dictionary preferably also includes a list of special features of each word used in the grammatical processing. The processor annotates the sentence words with this information. Preferably a second grammatical processing module 10b operates on the identified tags to develop a parse of the sentence.

A prototype embodiment was created having a main dictionary with 28,223 80-byte records, each having the complete grammatical information for a given "word" which is either a base form or an irregularly inflected form. These records were of three types, identified by a record type-code in column 80 to identify the types as "normal" (column 80 blank), "exception" ("$" in column 80) or "contraction" ("+" in column 80). Normal records correspond to the words with non-merged tags and (if they are nouns or verbs) regular inflections; exception records correspond to the words with non-merged tags that are members of an irregular (noun or verb) paradigm (these words may also be members of regular paradigms or uninflectable tag groups); and contraction records correspond to the words with merged tags (that is, tags that contain a "+", indicating that the corresponding word is a contraction of some type).

FIG. 2 is a listing of the grammatical and syntactic tags used in the described prototype embodiment to compactly encode the information for each word. Each tag is represented in the drawing by a one to three character mnemonic and also by a one to two digit tag code. There are ninety-three such tags, although any given text word will generally have between one and six possible tags. Each tag indicates a possible syntactic use of the word, or an inflection. The dictionary records may also include certain information encoding word features such as gender, and number agreement behavior for nouns, and person or number agreement features for verbs. It will be appreciated that different or additional tags may be used, dependent in part on the structure of the grammatical processing which is to be performed on annotated words. For example, in addition to the xx parser-internal tag, a number of "tentative tags" may be defined each of which corresponds to a "tentative" identification of the word. Such a tentative identification may result, for example, when a processing protocol identifies a word as an abstract noun by recognition of a characteristic suffix, without having located a base form in the dictionary, as discussed further below.

FIG. 3A-3C shows examples illustrating the format of the normal, exception and contraction records of the prototype dictionary discussed above. The records each include the retrieval form of the main dictionary entry, left-justified with blank fill in columns 1-25 as field one, and the record type code discussed above as the last entry in the last field at column 80.

FIG. 3A contains examples of "normal" main dictionary records. Normal records comprise approximately ninety-five percent of the database, and contain five fixed-format fields, which include, in addition to fields one and five described above, the following.

Field two contains noun base form inflection code information, if the base word has a noun form, for the word in field one, and occupies columns 26 through 29. These code bits enable the construction of any desired inflection from the stored base form.

Field three contains the verb base form inflection code information, if the base form has a verb form, for the word in field one, and occupies columns 30 through 33; these code bits compactly encode the verbal inflections corresponding to the base word.

Field four contains all other syntactic tags for the word in field one, as well as any noun or verb feature annotations, and occupies columns 34 through 77; the feature annotations that may appear in this field are useful in parsing and noun phrase determination discussed briefly.

As noted above, noun and verb codes, if either occurs at all for a given word, are confined to the fields before column 34; all other tags must occur starting in or after that column. The inflection codes of fields two and three are used in connection with an inflectional analysis procedure described below and illustrated in FIG. 6. This method of encoding not only allows the fast recognition of attributes of a word which has been located in the dictionary, but very compactly allows a few dictionary entries to encode a large number of word variants and inflections.

For example, "back", the tenth word in FIG. 3A, is encoded as being both a noun and a verb, both of inflectional class one, yielding the paradigm [back, back's, backs, backs'] for the noun usage and [back, backs, backed, backing] for the verb, as well as an adjective and an adverb (with tag codes as "JJ" and "RB", respectively). Although, including inflectional variants, this accounts for six different words (ten different word-plus-tag pairs), only one record (that corresponding to the base form; i.e., "back") is stored in the database; all of its inflectional variants are recovered by an analysis/synthesis procedure, called "unflection/inflection", described below. This is a method of compactly encoding an electronic dictionary so as to recognize, derive and construct inflectional variants of stored base forms.

One such unflection/inflection processor is described in detail in issued U.S. Pat. No. 4,724,523 filed July 1, 1985 and entitled "Method and Apparatus for the Electronic Storage and Retrieval of Expressions and Linguistic Information" of inventor Henry Kucera, the disclosure of which is hereby incorporated by reference. Its operation is further described below, by way of illustration, in connection with FIG. 6.

Further, in compiling the dictionary, if an inflectional variant is a base form in its own right, it is listed separately in the database with the appropriate code for this usage. For example, "backing" is stored as a noun of inflectional class one, denoted N1, representing the paradigm [backing, backing's, backings, backings']. This dictionary entry is in addition to its inflectional usage as the present participle of the verb "to back"] which would be recovered by inflection from the base form "back" discussed above.

Continuing with the description of the structure of the main dictionary of a prototype embodiment, FIG. 3B shows examples of exception records. These records contain elements (either base or inflected forms) that are members of irregular nouns or verb paradigms. In these records, the format of fields one to five are similar to those of normal records shown in FIG. 3A, except that field four contains one or more substrings delimited by parentheses. The material between parentheses identifies an irregular tag and the appropriate base form for processing for such tag.

FIG. 3C illustrates contraction records. These records lack the fields two through four of the foregoing two record types, and instead have a field two which contains from one to five merged tag representations (stored starting in columns 26, 36, 46, 56, and 66, respectively), and occupies columns 26 through 77. The last field, as with the other two types of records, contains certain special processing annotations, and occupies columns 78 through 80; in the prototype, the only codes that occur in this field are the record type-indicating codes that occur in column 80. As shown in FIG. 3C, the illustrated record for the word "ain't" indicates that it is recognized as a contraction with a tag string consisting of the auxiliary tags corresponding to the set of words ("am", "is", "are", "has", "have"), plus the negation marker "*" corresponding to the morpheme "n't".

As a practical matter the 93 distinct tags listed in FIG. 2 which may be associated with words of the dictionary need not be directly accessed during many grammatical processing steps, and the invention contemplates the annotation with other sets of tags, or with tags indicative of more general syntactic properties. For processing in one prototype embodiment, for example, the 93 tag classes are broken down into thirty-two classes. These classes are listed in FIG. 4. Each of these thirty-two classes of tags falls into one of three categories, namely (a) nineteen classes which can only occur in noun phrases; (b) seven classes which can only occur in predications; or (c) six classes which are not restricted in occurrence. In FIG. 4, each class is indicated by a two-character mnemonic, a description, and the number of distinct tags (of the 93 tags shown in FIG. 2) in the class.

In addition to the annotation of words of a sentence with tag classes, certain feature annotations of elements that may operate as the head of a noun phrase, and of elements that can only occur in a non-head position in a noun phrase are preferably included in the dictionary records. These annotations encode features such as the number or gender behavior of the words. Other annotations may encode the "rank" which characterizes the order of a pre-nominal occurrence of a pre-nominal word within noun phrases. Such feature bits and rank may be used in a grammar processor, for example, in the construction of, or recognition of noun phrases. For the present, it suffices to point out that for a grammatical analyser the dictionary entries preferably contain coded noun phrase rank and added feature bits for nominal and pre-nominal elements, in addition to the word tags.

FIG. 5 shows the tag annotations retrieved for the words of a representative sentence by the dictionary look-up and annotation processing just described. In one slightly simpler sentence than the one illustrated in the figure, "John wants to sell the new metropolitan zoo animals.", the words "John", "the", "new", "metropolitan" "zoo", and "animals" are unambiguously tagged NP, AT, JJ, JJ, NN, and NNS to indicate their sole interpretations as proper noun, article, adjective, adjective, singular common noun, and plural common noun, respectively. Each of the words "wants", "to" and "sell", however, receives two tags as follows wants . . . NNS, VBZ as the plural of the base form noun "want", or the third person singular present tense of the verb to . . . IN, TO as the preposition or the infinitival "TO"

sell . . . VBI, VBP as the infinitival or the non-third person singular present tense verb.

Thus, the number of possible tag strings obtained by selecting one of the possible tags for each word of the sentence is eight, and in general is obtained by multiplying together the number of possible tags for each word of the sentence.

This number may escalate rapidly. For the illustrated sentence "John wants to sell the new metropolitan zoo all his cleverly trained and brilliantly plumaged parakeets.", which is obtained by replacing "animals" in the previous example with a long noun phrase, introduces twenty four possible tag strings for the words of the noun phrase alone, raising the total number of possible assignments of tags to the sentence as a whole to $(8) \times (24) = 192$. FIG. 5 shows the tag annotations for this latter sentence.

It will be apparent that by providing a dictionary which compactly encodes the possible tags for each word, the above system of annotation provides a large set of data against which to check grammatical patterns. A principal use of the system is as a pre-processor for a grammatical text analyser.

As noted above, the main dictionary is a dictionary of base forms annotated with codes indicative of grammatical and inflectional tags and feature information, and each text word is processed by an "unflection" procedure which operates on the word to identify its base form by stripping suffixes therefrom if possible to produce a probable base form, and looking up the probable base form in the dictionary. When a word is successfully located in the dictionary, its inflectional codes are checked to confirm that it is a legal inflection of the stored base form. The base form and stored tags are then placed in an annotated record for the word.

In the described prototype embodiment, each noun base form in the dictionary is either encoded according to one of four regular inflectional paradigms, denoted N1-N4, or according to a partial or defective paradigm. Each verb base form is either encoded according to a regular verbal paradigm, denoted V1-V4, or according to a modified paradigm V1d, V2d, or V4d with a doubled consonant, or a partial or irregular paradigm. These noun and verb inflectional paradigms are described in greater detail in Appendix $A_0$ attached hereto and entitled Encoding of Inflections. It will be understood that, as regards partial or defective paradigms, other classes may be defined, within the general constraint of efficiently encoding as many words as possible having one or more inflections varying slighty from a regular inflection class.

Figure 6:
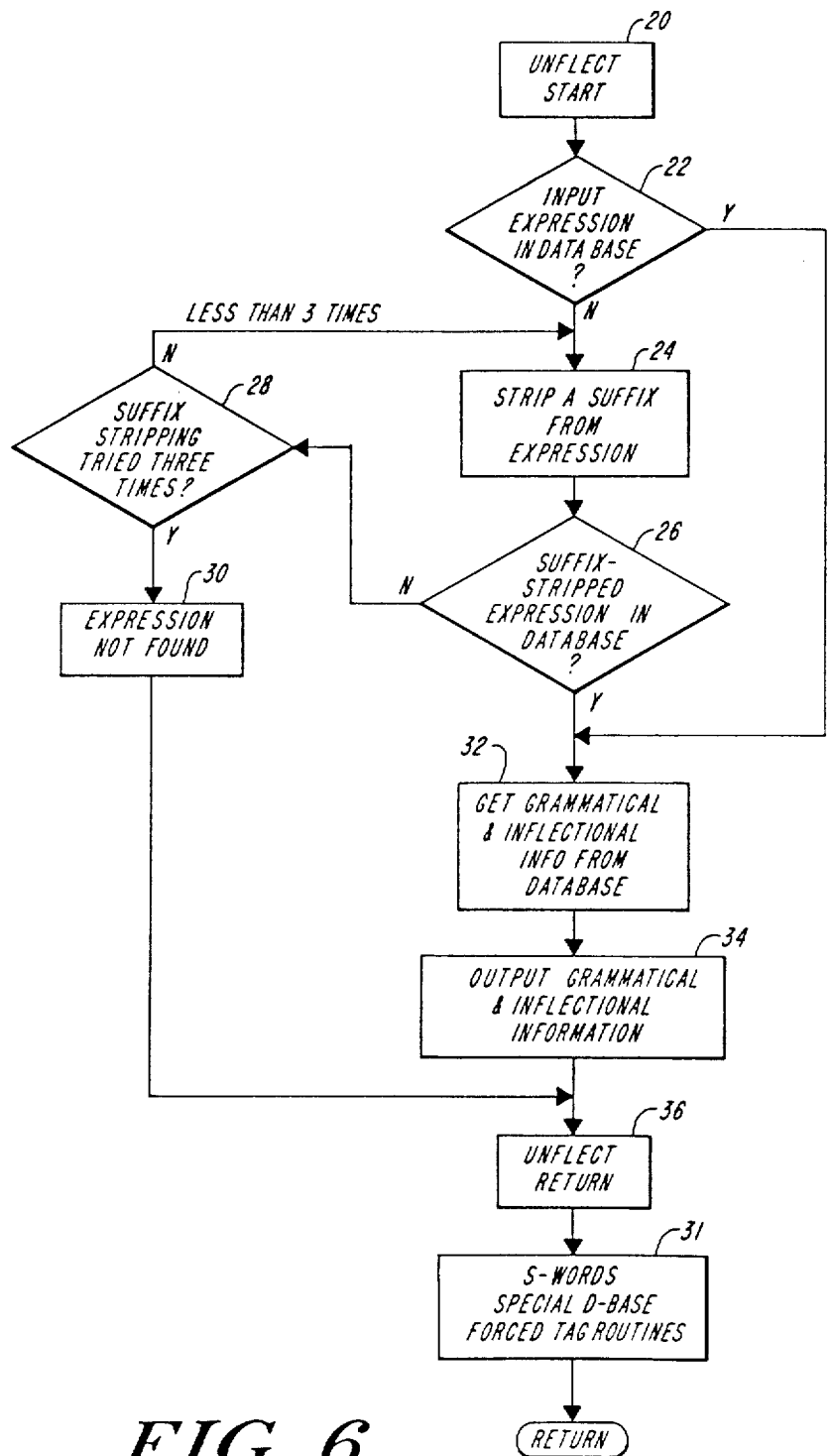
FIG. 6 is a flow chart of a word tag annotation processor.

FIG. 6 shows the overall "unflection" processing for looking up a word of the text in the dictionary to provide basic grammatical information annotations. This Figure corresponds in major part to FIG. 7 of the aforesaid patent, U.S. Pat. No. 4,724,523 and reference is made thereto for a description in detail for the embodiment disclosed in that patent application.

As shown in FIG. 6, on entry at 20 the unflection processor takes an input word and checks at 22 whether the identical expression is in the dictionary database. If so, it proceeds at step 32 to retrieve the associated tags and inflectional class codes from the dictionary record and, at 34, to insert these annotations in a processing record for the word of the sentence. This processing record is denoted SEN-NODE, and is a data structure which receives the data annotation, such as tags and feature bits, developed or retrieved during processing.

If, on the other hand, the identical word is not a dictionary entry, then a loop 24, 26, 28 is entered in which the processor strips an inflectional suffix, looks up the remaining root (or a transformation thereof) in the dictionary, and, if it finds a matching dictionary base form, retrieves and outputs the associated tags and codes. In addition, for words (denoted "expressions" in the Figure) which do not yield a dictionary-listed base form, additional processing is performed at step 31 to create a provisional "dictionary record" which includes a dummy base form and a list of likely tags for the word. The various types of additional processing are denoted by "S-Words", a processing module which recognizes certain classes of words which, from their morphology, appear to be created by affixation; "forced tag routines", a collection of processing modules which recognize other special classes of words or assigns tags by default; and "special databases". The special databases may, for example, include special listings of nonsense words, idiomatic expressions, proper nouns, or technical words peculiar to the document or user, which have not been integrated into the main dictionary.

These special extensions to the unflection processor together constitute a morphological analyser which provides tag and feature annotations for substantially all words likely to occur in the input text.

The basic unflection processor, denoted GcsUnfl, operates as follows.

In broad terms, first, it removes possible inflectional endings (e.g., "s", "ed", "ing", etc.) from the end of an input text word, and then checks the GCS main dictionary to determine if the remainder of the word occurs in it. If a match occurs, then the input word is a possible inflected form of the retrieved word, and the inflectional codes of the retrieved word are therefore checked. If inspection of these codes indicates that the retrieved word allows the inflectional suffix that was removed from the input word to be added to it, then the input word is recognized as an inflected form of the retrieved word, which is thus its base form, and is analyzed as such.

Figure 10:
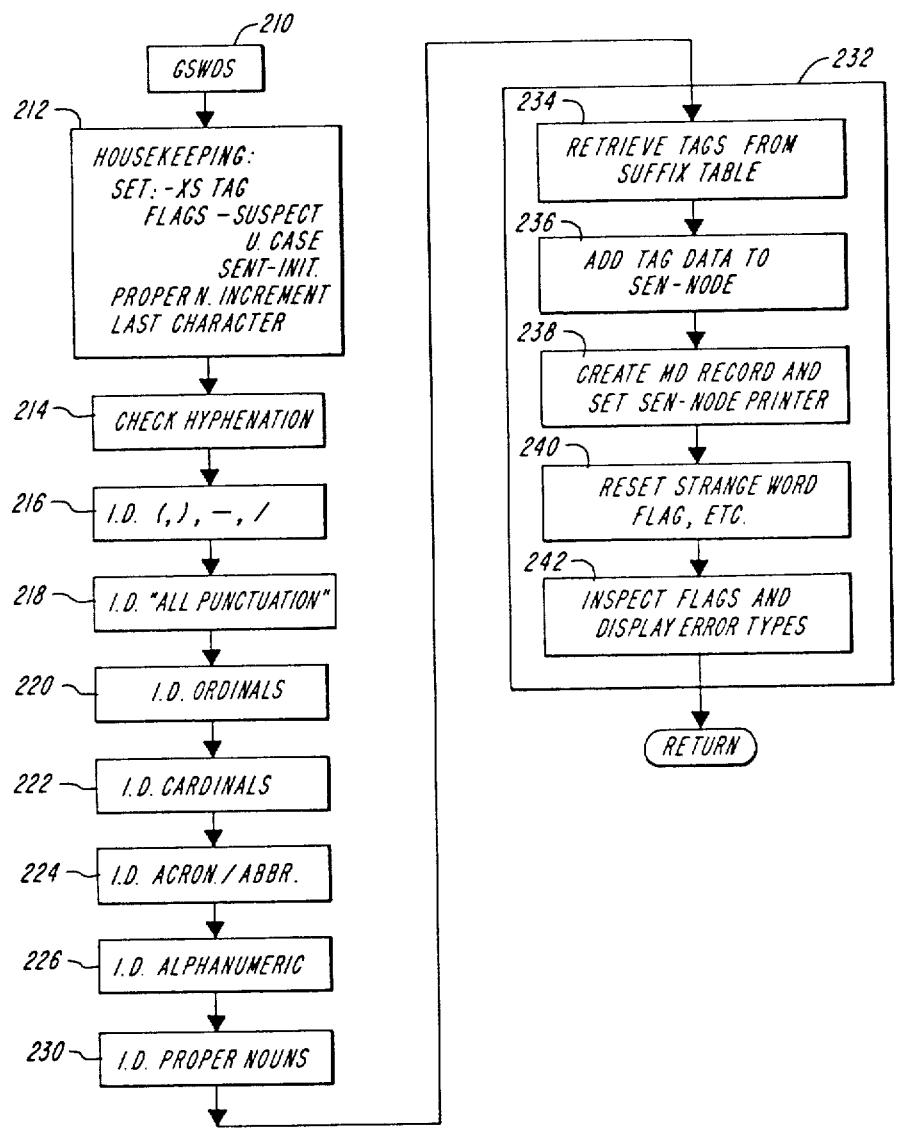
FIG. 10 shows a flow chart of preferred annotation processor.

More precisely, the suffix analysis procedure of the GcsUnfl processor proceeds as follows: (a) if the given text word ends in an apostrophe, then the apostrophe is removed and a special flag is set and (b) a dictionary retrieval attempt is then made on the resulting form. If this form is retrieved, and the retrieval sub-procedures determine it is the base form, then no further analysis is necessary; otherwise the analysis continues as follows: (c) if the word ends in an "s", then only the steps described in paragraph (i) of the below processing are executed; if the word ends in "ed", then only the steps described in paragraph (ii) of the below processing are executed; and if the word ends in "ing", then only the steps described in paragraph (iii) of the below processing are executed. If none of the above is true, then no further inflectional analysis of the word is possible, and the inflectional analysis procedure returns to its calling procedure. In the latter case, other processing steps are applied to generate a tentative tag string for the word by checking the word against special databases, and analyzing it for the occurrence of derivational affixes (described in connection with FIG. 10).

A suitable unflection protocol used in a prototype processing apparatus is as follows.

(i) If the word ends in an "s" (or "s" followed by an apostrophe, which will be the case if the word-final apostrophe flag has been set by step (a) above), then it might be a singular noun possessive form, a plural noun form, a plural possessive noun form, or a verb third-person singular present-tense form, according to the exact form of its ending, as specified below. The ending analysis procedure proceeds as follows (a) remove the word-final "s" and look up the word; if unsuccessful, then (b) if the current last letter of the word is an "e", then remove it and look up the word; if still unsuccessful, then (c) if the current last letter of the word is an "i", then replace it with "y" and look up the word; otherwise (d) if the last two letters of the current form of the word are identical, remove one and look up the word. If in step (b) of the above process, the current last letter of the word was an apostrophe instead of an "e", then the remainder of the algorithm will by bypassed and the word checked to see if it is a possessive form ending in "'s". In all of the above cases, "success" is defined as both retrieving a word and determining that its base form inflectional codes allow the occurrence of the ending in question. This prevents the overgeneration of inflected forms that is often a problem in simple suffix-removal algorithms that do not have the capacity to check to see if a given suffix is legal on a given word.

A simpler process is used in the case of words ending in "ed" and "ing".

(ii) For the former: (a) the "ed" suffix is removed immediately and the resulting form is looked up in the dictionary; if this is not successful, then (b) if the last two letters of the current form of the word are identical, then one is removed and the resulting form of the word is looked up; if this is not successful, then (c) if the current last letter is an "i", then it is replaced by "y" and the resulting form looked up in the dictionary. If this is not successful, then (d) the "y" is changed back to "i" and the algorithm continues by adding an "e" to the end of the word and looking it up in the dictionary. In the above four cases, "success" is defined as it is in paragraph (i) above, with the further distinction that before a word is accepted as an "ed" form, the verb base from codes on its main dictionary record are checked to ensure that it does not have an irregular past tense/past participle form.

(iii) In the case of the "ing" suffix, an algorithm similar to that used for the "ed" suffix is used, with the main differences being: (1) in case (c) the letter must be "y" instead of "i" (and it is changed to "ie" before the main dictionary is checked), and (2) "success" is defined as in paragraph (i) above, and not as in (ii), since the occurrence of irregular past forms does not affect the form of the verb's present participle.

During the above processing the occurrence of "near" successes in matching an input word to a retrieved word is detected (e.g., a retrieved form with the inflectional code "V1" might be recovered when "V1d" inflectional construction is actually required for a precise match). Near successes of this type are recorded so that if an exact match is not obtained for a given input word, an attempt at correction may be made based on the nearly successful match. For example, in the case of the input word "computting", the base form "compute" will match if its code is "V1d" instead of "V1"; since this is the best match, "computting" is corrected to "computing", by modifying its "V1d" code to "V1" and an error message to that effect is printed. "Near Success" is defined rigidly in the prototype implementation of the program, as a one-feature discrepancy in the retrieved codes within a given word class, so these corrections turn out to be valid in virtually all cases. The construction of error messages is accomplished by indexing a particular type of detected error to a generic error message for that type of error, such as "Consider 'x' instead of 'y'."

The processor, having previously found the dictionary base form and inflection code, inserts the existing text word and a synthesized correction in the blanks for x and y, and displays the error message.

In order to illuminate the above process, the following examples are presented.

To start with, the most common elements of an English language text (short function words such as "the" and "a", punctuation marks, and auxiliary verb forms such as "is" and "has") fall into the class of words handled most efficiently by the program. Since every word is looked up in the main dictionary without modification when the procedure is entered, these words are found immediately. If a word is found and is too short to be an inflected form of another word (i.e., is a member of the first two classes of common words given above) or has already had a base form assigned by the retrieval process, then GcsUnfl returns to its calling procedure without any further processing. On the other hand, if the word has not been found, or if it has been found, but is long enough and has the terminal characters to be the inflected form of another word, then processing continues in the manner described in the above algorithm.

For example, if the word "bearing" has been entered, then its noun interpretation ("bearing") is recovered immediately, and its present participle interpretation (from the verb "bear", which is also saved as its verbal base form) is recovered after the "ing" suffix is removed during the execution of the first step of the algorithm described above in paragraph (iii). Similarly, if the word "advanced" is entered, then its adjectival interpretation ("advanced") is recovered immediately, and its past tense/past participle form (from the verb "advance", which is also saved as its verbal base form) is recovered during the fourth step of the algorithm described above in paragraph (ii).

This process proceeds as follows. First an unsuccessful retrieval attempt is made for the form "advanc", then the second and third steps of the algorithm are bypassed (since "advanc" does not end in a doubled consonant or the letter "i"), then "e" is added to "advanc" and a main dictionary record is retrieved corresponding to this word. Once this record has been retrieved, it is checked for the occurrence of a verb base form that has an inflected form ending in "d"; since there is indeed such a form, the additional verbal interpretation of "advanced" noted above is added to the existing adjectival interpretation. The main dictionary record corresponding to "advance" also has a noun interpretation (in inflectional class one) and an adjectival interpretation ("advance", as well as "advanced" may be used as an adjective), but since neither of these interpretations has an inflectional variant formed by the addition of "d" to the base form, they are ignored during this particular retrieval.

Note that if a word like "creed" is entered, the only interpretation is as a noun base form; the "-ed" ending, in this case, is not inflectional, but is actually part of the base form. As can be seen from the algorithm description of the GcsUnfl procedure, three probes are made into the GCS main dictionary in this case: (1) with the test form "creed", which results in the retrieval of its usage as a noun base form; and (2) and (3) with the test forms "cre" (suffix "-ed") and "cree" (suffix "-d"), which each result in no retrieval. Even though this process involves two unsuccessful probes into the GCS main dictionary, it is necessary because of the occurrence of words such as "agreed", where the first probe will obtain its adjectival usage and the third its usage as the past tense form/past participle of "agree", and normal verb past forms such as "abandoned", where the first probe will obtain its adjectival usage and the second its usage as the past tense form/past participle of "abandon" (since both probes are successful, no third probe is made, since once the second retrieval has been successful, there is no English verb base form that will fit the description necessary for the third retrieval to be successful as well).

After GcsUnfl has returned to its calling procedure, any text word which is identical to its base form, or is an inflection formed by adding "s", "s'", "ed" or "ing" will have been looked up in the dictionary, and its possible tags will have been ascertained from the dictionary records.

In the preferred prototype implementation of a grammar processor according to the invention, the unflection and dictionary look-up processing just described are supplemented with a further set of special processing steps, and look-up procedures in one or more special dictionaries to provide grammatical processing tags for a greater class of text words than the routine dictionary entries and inflections. This further processing will be described below, after a complete description of an entire grammar processing system. However, for the moment, for clarity of illustration, it will be assumed that, at this stage, each word of the text has been annotated with a string of its possible tags and its corresponding base form.

Figure 7:
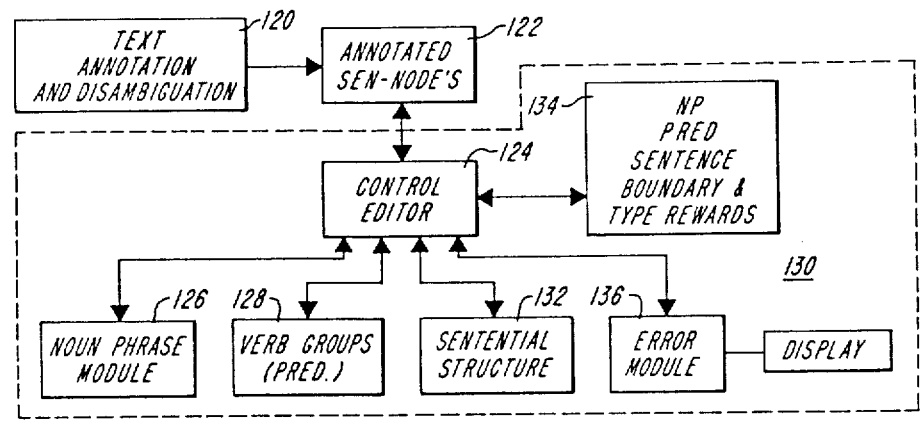
FIG. 7 shows the processing of a general grammatical analyser operative on disambiguated text.

FIG. 7 shows the construction of one such grammatical text analyser in which a text annotator 120 according to the invention provides a data output including a SENTENCE NODE (or SEN-NODE) data structure 122 for each word. The SEN-NODE includes the position of the word in the text sentence, and the word base form with its tag and feature annotations. A grammatical analyser 130 then operates under the control of control module 124 on the annotated word data to successively build up larger syntactic structures and to derive a parse of a text sentence. At each step it annotates the SEN-NODE, and creates records of higher level structures as described below, with derived data.

In this construction, the set of sentence nodes is processed in three general phases using techniques of linguistic string analysis, as follows: (a) the identification of the simplex noun phrases (NP's) in the sentence, and if there is more than one simplex NP, their combination (where possible) into complex NP's; (b) the identification of the simplex verb groups (VG's) in the sentence and, if there is more than one simplex VG, their combination, where possible, into complex VG's; and (c) the identification of the simplex sentences or clauses in the (matrix) sentence and, if there is more than one simplex sentence, their combination, where possible, into complex sentences. The second phase (b) may also include the analysis of the predication structure of the elements within the simplex VG's and also the assignment of tentative structure to the sentences that contain them and their NP subjects and objects.

The NP processing 126 of the first phase may be accomplished using the tag annotations as follows. For each pre-nominal tag, a "rank" is assigned corresponding t its functional position in noun phrase construction. Thus, pre-qualifiers and pre-quantifiers have rank 0; determiners, articles, possessives have rank 1; post-determiners (tag AP) have rank 2; cardinal and ordinal numbers, rank 3; comparative and superlative adjectives, adverbs, qualifiers, and semantic superlatives such as "top" have rank 4; adjectives rank 5; and post-qualifiers rank 6. With such information available from the tag of each word, noun phrase determination is accomplished in a double-scan of the sentence.

The parser first ascertains NP boundaries by inspecting tagged words and applying ordering criteria to their rank. A second scan then operates on the simplex NP structures so determined to perform the complex NP processing. This loop detects complex phrases having prepositional phrases, a coordinating conjunction, or certain coordinating constructions. Processor 126 then creates a complex NP record for each complex NP which includes pointers to the component NP's, and the boundaries of the complex NP. It also derives appropriate feature agreement properties (number, gender) of the complex NP.

Once the NP-structure of the sentence has been determined, a predication analyser 128 is called and inspects the portions of the sentence that are not incorporated into nominalizations, and assigns predicational structure to these portions where appropriate.

After operation of module 128, the nominal predicational structure of the sentence has been determined. Some sentential structure is also determined, since, as a by-product of the process of predicational analysis, tentative assignments of subjects and their corresponding finite predications are made.

At this point the controller 124 analyzes the higher syntactic structure of the sentence by a clausal analysis module 132 that inspects the tentative sentence-level structures generated by module 128 and either confirms them or replaces them, as appropriate.

The noun phrase and verb group modules each insert boundary markers and provide other data to appropriate registers 134 which maintain boundary data and feature information for noun and verb groups. This allows concordance rule checking between different syntactic components of the sentence. Preferably, an error message module 136 displays error messages when errors are detected.

With this overview of a grammar processor operative on text having tag-annotated words, and of the dependence of its processing units on the tag annotations of processor 10a, and of the interrelation of the units of such processor for annotating encoded text and processing the text to derive precise grammatical information, further details of the preferred word annotation processing will now be described.

It will be recalled that the annotation of text words with their possible tags was described in connection with FIG. 6 showing the inflectional analysis procedure. This annotation employs a suffix-stripping procedure, a dictionary look-up procedure, which together constitute unflection, and a tag-driven inflectional synthesis procedure to identify and confirm each identified dictionary base form of the text word and its corresponding tag(s), so as to identify and correctly annotate a text word for further grammatical processing.

Figure 8:
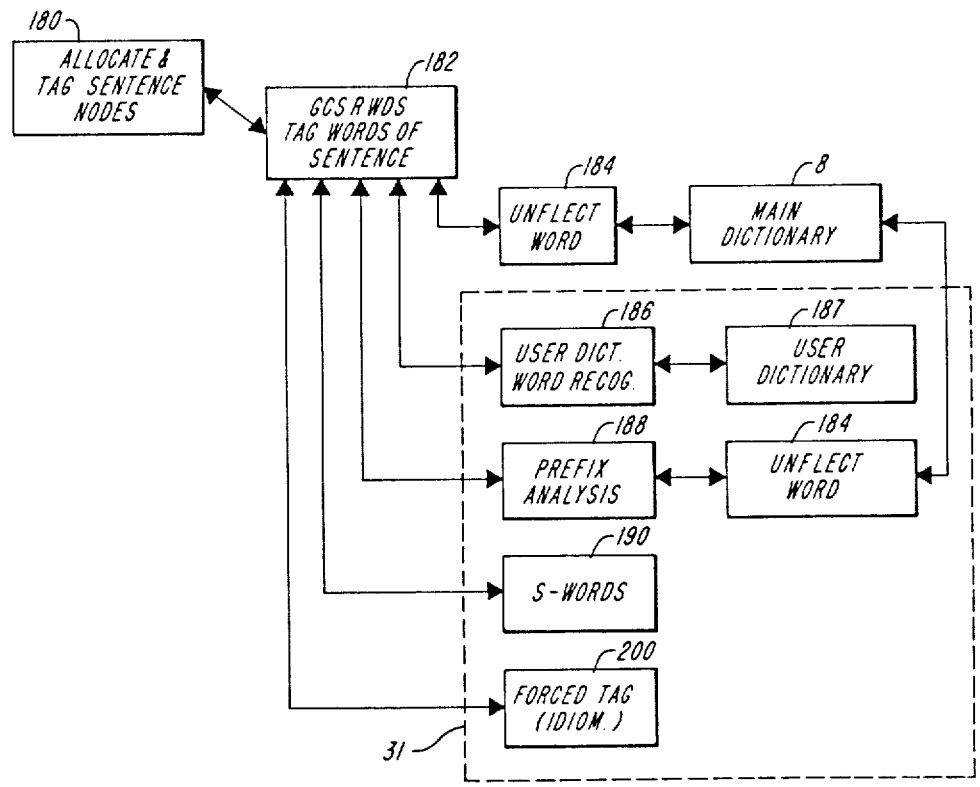
FIGS. 8-9 show further details of one prototype text word annotation processor.

In a further embodiment of the invention, the word-annotating range of the processor has been extended by the inclusion of further word-recognizing or -annotating mechanisms, indicated in FIG. 6 generally by processor stage 31 under the designation "S-words, Special Database and Forced Tag Routines". FIG. 8 shows in greater detail the structure and interrelationship of these further word-recognition processing units.

As shown in FIG. 8, a general flow of control program within the processor includes a section 180 which allocates and inserts tag data in an ordered set of sentence node structures. The data is obtained by calling a word-recognition module 182 which, as discussed in detail in connection with FIG. 6, takes successive words of the text and performs an inflection analysis 184 with one or more character-stripping and look-up operations in the main dictionary 8.

When the main dictionary reveals no base form corresponding to the input text word, the recognition module 182 summons one or more morphological analysis or ancillary word recognition modules 186, 188, 190, 200 to identify tag annotations and, where appropriate, to provisionally develop base form information for the text words. These ancillary recognition modules include the following.

First, a special user dictionary 187 is maintained which includes special or technical terms which are entered and accumulated by the user, either for a particular document, or for the user's particular vocabulary, such as a specialized scientific vocabulary. A look-up routine 186 checks whether the given text word appears in the special dictionary, and, if so, retrieves its tag and feature annotations.

A second ancillary recognition module is a prefix analyser 188 which inspects the first letters of a text word to recognize and strip common prefixes. The remaining root portion of the word is then subject to inflection processing 184 to determine if the root is in the main dictionary. This processor recognizes words such as "counterterrorist" or "antigovernment".

A third, and major, ancillary processing module 190 is evoked to analyze words which have not been "recognized" by the processor stages 184, 186, 188. This module, denoted "S-WORDS", performs a number of suffix-stripping operations, distinct from the inflectional suffix-stripping of the inflection processor, to recognize and, where appropriate, annotate certain rare text words. S-WORDS also includes special processing submodules which, for example, identify such words as the literal alphanumeric strings "141st", "142nd", "143rd", and "144th". These are recognized as ordinal numbers by the pattern of their last digit and following letters (1, 2, 3, or any other digit followed by, respectively, st, nd, rd, or th). Another example is the recognition of abstract common nouns by an ending such as "ness". The S-words module is discussed in greater detail in connection with FIG. 9, in which a number of the S-WORDS special recognition routines and their detailed operation are set forth.

Finally, text words not identified by any of the procedures 184, 186, 190, a forced tag routine 200 is initiated. In the above described prototype embodiment, routine 200 identifies idiomatic expressions and common phrases of foreign-language provenance. This is done by maintaining a table or list of such expressions, each expression consisting of several words which are "bound" to each other, in the sense of co-occurring as a single syntactic unit. If a text word, e.g., "carte" is found to be on the list, a search is made among the sentence nodes for the other words of its stored idiomatic occurrence "a la carte" or "carte blanche", and if the other words are found in the text, the tags (e.g., as adverb and adjective for the expression "a la carte") are determined from the table and placed in the appropriate sentence node records.

It should be noted that this forced tag processing for idiomatic and foreign expressions may be implemented in a variety of ways, and the ordering of steps shown in FIG. 8 may be changed in other embodiments. Thus, for example, words such as "carte", "priori" and the like may be stored in the main dictionary with a special flag or other identifier, so that at the first recognition stage (the dictionary look-up stage of unflection 184) the word is retrieved. In that case the flag or identifier triggers the special processing. For example, it may be used to locate a bound phrase ("a la carte", "a priori") in a table and subject it to processing immediately, rather than following the occurrence of morphological prefix and suffix analysis as indicated in FIG. 8. This approach has been followed in a presently preferred embodiment.

Figure 9:
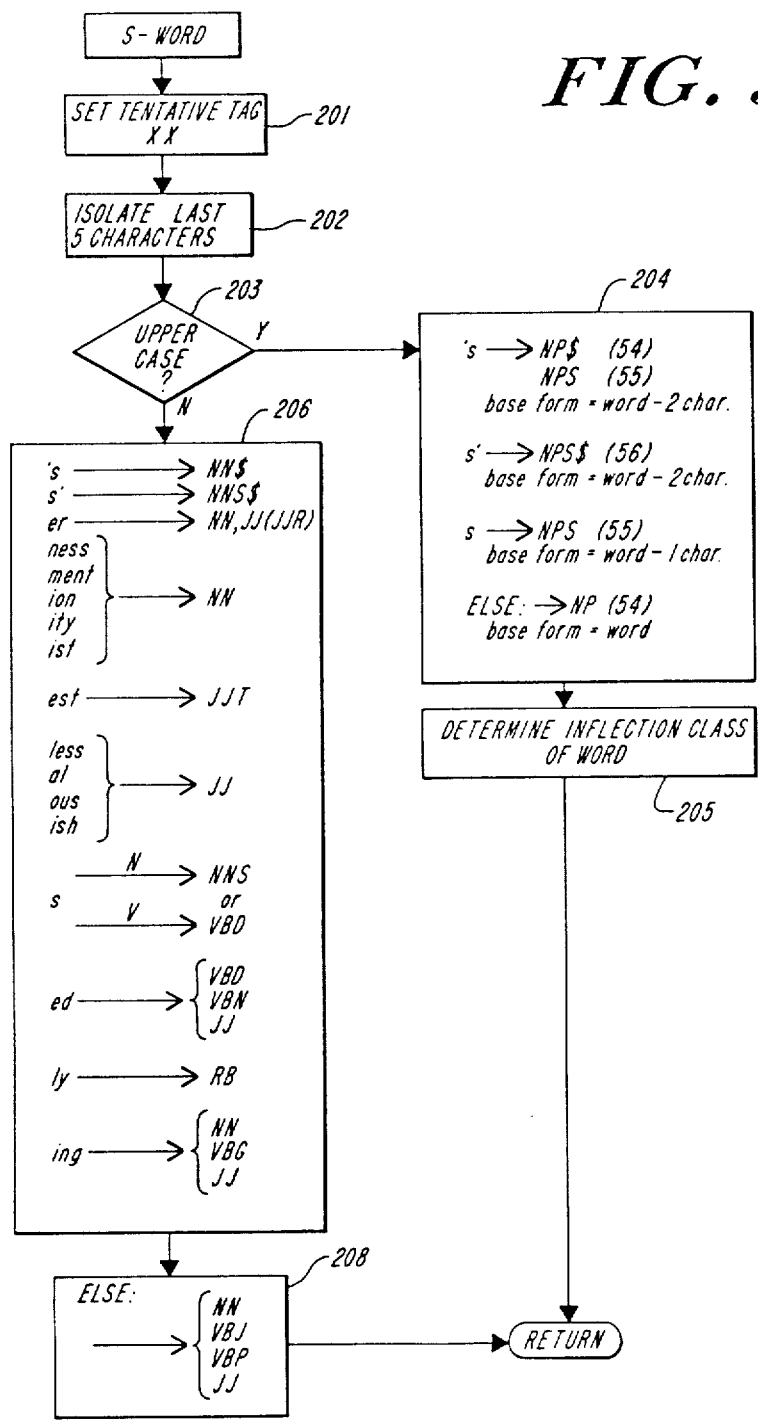

FIG. 9 shows further details of the text word annotation processing, with particular reference to the suffix analysis procedures, collectively called the S-WORDS processor 190 of one prototype embodiment. This processing module assigns one or more tags to a word based on a morphological analysis of the word's inflectional and derivational morphology, appearing in its suffix-like components. The processor also generates a tentative base form for the given word if it appears to be a noun or verb, and sets a code indicative of the inflectional class of the tentative base form.

Upon entry, the S-word processing module, denoted S-WORDS, sets the basing pointer for the SEN-NODE's to point at the SEN-NODE referenced by an initial parameter and, at step 201, sets up a "tentative tag" marker in the appropriate slot of the codes on the SEN-NODE corresponding the current word. This marker serves as an indicator in the word's SEN-NODE record that the listed tags are algorithmically, rather than lexically, derived and may thus be somewhat suspect and subject to revision or user review at a later stage. Next, at step 202, the processor inspects the ending characters of the word. At this point, the processor may also be configured to check the current value of the display flags, and, if a program display flag has been set, to display the current input word as part of an execution trace for the user's information.

Next, at 203, S-WORDS checks whether the input word is capitalized. If so, then at 204, the appropriate "NP" tag and base form are generated for it, as follows:
(a) a data structure BASE-STR is allocated (since a probable base form is to be generated by S-WORDS for all NP's, regardless of their inflection); and (b) the ending of the NP is checked for possible inflectional morphology, as follows.
(b1) If the word ends in the singular possessive (and optional plural) marker "'s", then:
  (b1a) an internal tag adding procedure is called to insert tag code 54 in the current SEN-NODE, in order to add the "NP$" tag to the current word's tag string;
  (b1b) the parameters for the internal tag adding procedure are reset to insert tag code 55 in the current SEN-NODE, thus adding the "NPS" tag to the current word's tag string (because for certain NP's the "s" ending is sometimes used both as singular possessive and plural marker); and
  (b1c) the probable base form of the current word is generated as being the word's input form minus its final two characters.
(b2) If the word ends in the plural possessive marker "s'", then:
  (b2a) the internal tag adding procedure is set to insert tag code 56 in the current SEN-NODE, thus adding the "NPS$" tag to the current word's tag string; and
  (b2b) the probable base form of the current word is generated as being the word's input form minus its final two characters.
(b3) If the word ends in an "s", then:
  (b3a) the internal tag adding procedure is set to insert tag code 55 in the current SEN-NODE, thus adding the "NPS" tag to the current word's tag string; and
  (b3b) the probable base form of the current word is generated as being the word's input form minus it final character.
(b4) Otherwise, if the word does not end in any of the above possibilities, then:
  (b4a) the internal tag adding procedure is set to insert the tag code 53 in the current SEN-NODE, thus adding he "NP" tag to the current word's tag string; and
  (b4b) a copy of the current word is stored as its own probable base form.

Following this designation of appropriate NP tags, at processor stage 205 the probable inflectional class of the base form that was generated above is determined as follows:
(c1) If: (1) the current word has been given the tag "NP" and it ends in "s", "x", "z", "ch", or "sh"; or (2) the current word has been given the tag "NPS" and it ends in either "'s" or "es", which is preceded by any of "s", "x", "z" "ch", or "sh"; or (3) the current word has been given the tag "NPS$" and it ends in "es", which is preceded by any of "s", "x", "z", "ch", or "sh"; then
  (c1a) it is given the inflectional code N2;
  (c1b) if it has been tagged as either "NP" or "NPS", then its inflectional tag value is modified to reflect that fact; and
  (c1c) if the final character of its base form is "e", then this character is deleted.
  (c2) If: (1) the current word has been given the tag "NP" and it ends in "y"; or (2) the current word has been given the tag "NPS" and it ends in as either "ies" or "y's"; or (3) the current word has been given the tag NPS$ and it ends in "ies", then (c2a) it is given the inflectional code N3;

(c2b) if it has been tagged as either "NP" or "NPS", then its inflectional tag value is modified to reflect that fact; and (c2c) if its base form ends in "ie", then this ending is changed to "y".

(c3) Otherwise (if neither of the above cases is true) the base form is given the code N1, and if it has been tagged as either "NP" or "NPS", then its inflectional tag value is modified to reflect that fact.

Finally: (d) an inflectional tag adding procedure is called with the parameters determined by the appropriate case above in order to add the specified tag to the current word's tag string; and (e) if the display flag has been set then the base form of the current input word is displayed as part of an execution trace; and S-WORDS returns to its calling procedure. This completes the S-WORDS processing in the event the text word was a proper (i.e. capitalized) noun.

Otherwise, if at stage 203 it is determined that the word does not start with an upper case letter, specific endings are checked for, and the appropriate tags are generated in stage 206 as follows.

If the word ends in "'s", then an "NN$" (noun singular possessive) tag is generated for it, as follows:

(a) the internal tag adding procedure is called to insert tag code 49 in the current SEN-NODE in order to add the "NN$" tag to the current word's tag string;

(b) a BASE-STR is allocated and the probable base form of the current word (i.e., its current form minus the "'s" ending) is stored in it; and (c) the ending of the word is inspected and the codes corresponding to its probable inflectional class are generated and stored in the BASE-STR as well. If the letter preceding the "'s" ending is a "y", then the current word's inflectional class is determined to be N3; if this ending is preceded by "s", "x", "z", "ch", or "sh", then its inflectional class is determined to be N2; otherwise it is determined to be N1.

If the word ends in "s'", then an "NNS$" (noun plural possessive) tag is generated for it as follows:

(a) the internal tag adding procedure is called to insert tag code 51 in the current SEN-NODE in order to add the "NNS$" tag to the current word's tag string;

(b) a BASE-STR is allocated and the probable base form for the current word (i.e., its current form minus the "s'" ending) is stored in it; and (c) the ending of this base form is inspected and the codes corresponding to its probable inflectional class are generated and stored in the BASE-STR as well. If the letters preceding the "s'" ending are "ie", then the current word's inflectional class is determined to be N3 and the "ie" ending of the base form is changed to "y"; if this ending is preceded by an "e" which is itself preceded by "s", "x", "z", "ch", or "sh", then its inflectional class is determined to be N2 and the "e" ending of the base form is dropped; otherwise it is determined to be N1.

If the word ends in "er", then both "NN" (singular noun) and "JJ" (adjective) tags are generated for it, as follows:

(a) the internal tag adding procedure is called (with its parameters set to indicate that tag code 48 should be inserted in the current SEN-NODE in order to add the "NN" tag to the current word's tag string;

(b) the internal tag adding procedure is called again to insert tag code 44 in the current SEN-NODE in order to add the "JJR" tag to the current word's tag string; and (c) a BASE-STR is allocated and a copy of the current word is stored as its own probable base form (with an inflectional class code of N1).

If the word ends in one of the nominal suffixes "ness", "ment", "ion", "ity", or "ist", then an "NN" (singular noun) tag is generated for it, as follows:

(a) a BASE-STR is allocated and a copy of the current word is stored in it (as its own probable base form);

(b) the ending of the word is inspected and the codes corresponding to its probable inflectional class are generated and stored in BASE-STR as well. If the current word ends in an "s", then its inflectional class is determined to be N2; if it ends in a "y", then its inflectional class is determined to be N3; otherwise it is determined to be N1; and (c) the internal tag adding procedure is called and set to insert tag code 48 in the current SEN-NODE in order to add the "NN" tag to the current word's tag string.

If the word ends in "est", then a "JJT" (morphologically superlative adjective) tag is generated for it by calling the internal tag adding procedure to insert tag code 43 in the current SEN-NODE; no base form is generated, since the word cannot be inflected.

If the word ends in one of the adjectival suffixes "less", "al", "ous", or "ish", then a "JJ" (adjective) tag is generated for it by calling the internal tag adding procedure to insert tag code 46 in the current SEN-NODE; no base form is generated, since the word cannot be inflected.

If the word ends in the suffix "s" and is not preceded by an apostrophe, then an "NNS" (plural common noun) tag is generated for it, and if inspection of the three characters that precede the "s" ending indicates that the word does not have specifically nominal morphology, then a "VBZ" (singular third-person agreement present-tense verb form) tag is also generated for it, as follows:

(a) the internal tag adding procedure is called to insert tag code 50 in the current SEN-NODE in order to add the "NNS" tag to the current word's tag string;

(b) if the last three characters of the word that precede the word-final "s" do not have specifically nominal morphology, then the internal tag adding procedure is called to insert tag code 85 in the current SEN-NODE to add a "VBZ" tag to the current word's tag string; and (c) a BASE-STR is allocated and the probable base form and the codes corresponding to its probable inflectional class are generated and stored in it, as follows.

If the letter preceding the "s" ending is an "e", then:

(a) if this "es" ending is itself preceded by an "i", then the current word's inflectional class is determined to be N3 (and also V3, if the word has been tagged "VBZ" as well as "NNS") and its base form to be its current form with the "ies" ending replaced by a "y"); or (b) if this "es" ending is itself preceded by any of "s", "x", "z", "ch", or "sh", then the current word's inflectional class is determined to be N2 (and also V2, if the word has been tagged "VBZ" as well as "NNS") and its base form to be its current form minus the "es" ending); otherwise (c) the current word's inflectional class is determined to be N1 (and also V1, if the word has been tagged "VBZ" as well as "NNS") and a copy of its current form is stored as its base form.

If the word ends in the suffix "ed", then: (1) "VBD" (finite past-tense verb form); (2) "VBN" (past participle); and (3) "JJ" (adjective) tags are generated for it as follows:

(a) the internal tag adding procedure is called and set to insert tag code 81 in the current SEN-NODE in order to add the "VBD" tag to the current word's tag string;

(b) the internal tag adding procedure is called again and set to insert tag code 84 in the current SEN-NODE in order to add the "VBN" tag to the current word's tag string;

(c) the internal tag adding procedure is called a third time and set to insert tag code 43 in the current SEN-NODE in order to add the "JJ" tag to the current word's tag string; and (d) a BASE-STR is allocated and the probable base form of the current word is determined and stored in it as follows:

(d1) if inspection of the two characters that precede the "ed" ending indicates that they are the same, then one of them is deleted from the base form of the word that is stored in the current BASE-STR (and the inflectional class code of the word is determined to be V1d);

(d2) if the character that directly precedes the "ed" ending is an "i", then the "ied" ending of the base form that is stored in the current BASE-STR is changed to a "y" (and the inflectional class code is determined to be V3);

(d3) if the "ed" ending is directly preceded by "s", "x", "z", "ch", or "sh", then the current form of the word minus the "ed" ending is stored in the current BASE-STR as the base form (and the inflectional class code is determined to be V2); and (d4) otherwise the base form is determined to be the current form of the word (minus its "ed" ending, unless the character preceding the "ed" is an "1", in which case only the word-final "d" is dropped) and its inflectional class code is determined to be V1.

If the word ends in the adverbial suffix "ly", then an "RB" (adverb) tag is generated for it by calling the internal tag adding procedure to insert tag code 74 in the current SEN-NODE; no base form is generated, since the word cannot be inflected.

If the word ends the suffix "ing", then: (1) "NN" (singular noun); (2) "VBG" (present participle); and (3) "JJ" (adjective) tags are generated for it, as follows:

(a) the internal tag adding procedure is called and set to insert tag code 48 in the current SEN-NODE in order to add the "NN" tag to the current word's tag string;

(b) the internal tag adding procedure is called again and set to insert tag code 82 in the current SEN-NODE in order to add the "VBG" tag to the current word's tag string;

(c) the internal tag adding procedure is called a third time and set to insert tag code 43 in the current SEN-NODE in order to add the "JJ" tag to the current word's tag string; and (d) a BASE-STR is allocated and the probable base form of the current word is determined and stored in it as follows:

(d1) if inspection of the two characters that precede the "ing" ending indicates that they are the same, then one of them is deleted from the base form of the word that is stored in the current BASE-STR and the inflectional class code of the word is determined to be V1d;

(d2) if the "ing" ending is directly preceded by "s", "x", "z", "ch", or "sh", then the inflectional class code is determined to be V2 and the base form is generated by dropping the "ing" ending from the word;

(d3) if the character that directly precedes the "ing" ending is a "y", then the inflectional class code is determined to be V3 and the base form is generated by dropping the "ing" ending from the word; and (d4) otherwise the base form is determined to be the current form of the word minus its "ing" ending, unless the character preceding the "ing" is an "1", in which case an "e" is added to the base form after the word-final "ing" is dropped, and its inflectional class code is determined to be V1.

Finally, at processing stage 208, if none of the above is true, then: (1) "NN" (noun); (2) "VBI" (infinitive verb form); (3) "VBP" (finite present-tense verb form); and (4) "JJ" (adjective) tags are generated for the word, by calling the internal tag adding procedure four times set to insert the tag codes 48 (for "NN"), 83 (for "VBI"), 85 (for "VBP"), and 43 (for "JJ") in the appropriate S-CODES slots of the current SEN-NODE.

Then a BASE-STR is allocated and a copy of the current word is stored in it as its probable base form, and the inflectional class codes (for both the nominal and verbal interpretations of the word) are determined and stored in it as follows:

(i) if the word's last character is a "y", then the inflectional class codes are determined to be N3 and V3;

(ii) if the word ends in one of the following letters or pairs of letters: "s", "x", "z", "ch", or"sh", then its inflectional class codes are determined to be N2 and V2; and (iii) otherwise the inflectional class codes are determined to be N1 and V1.

Finally, the display flags are checked and, if set, then if a base form has been generated for the word, this base form is displayed; otherwise a "no base form" message is generated; S-WORDS then returns to its calling procedure.

In accordance with a somewhat different prototype embodiment of the invention, the foregoing technique of suffix-recognition and tag assignment is effected by providing a suffix-recognition table which lists possible suffixes corresponding to classes of words commonly created by suffixation. For each suffix the table lists a set of tags (including the noun and verb inflection codes of fields two and three, if any) which the processor assigns to a word having that suffix and not otherwise located in the main dictionary or in a special database. A copy of the suffix table of that embodiment is attached hereto as Appendix A1 and is made a part of this application.

In this improved implementation, when the inflectional analysis and look up procedure (FIG. 6) does not locate a given text word in the main dictionary it returns a pointer the corresponding SEN-NODE and calls the word tagging module (denoted "Gswds" in this improved embodiment) to produce tag and feature code annotations. This module, written in the C programming language, sets a number of flags and determines a set of tags, inflectional codes, and features in the manner described below, which will be understood with reference to the module flow chart, FIG. 10.

First, at entry at 210 Gswds performs basic housekeeping functions 212 setting a tentative tag indicator XS and a "suspect word" flag. If the word commences with a capital letter, an "upper case" flag is set, and if the word is the first word in the sentence an "initial word" flag is set. A determination is made whether the word is a proper noun, and, if so, a proper noun increment is set. In the prototype, this increment is a number (5) which is later simply added to a common-noun tag (numbers 48 to 51 of FIG. 2) to obtain the corresponding tag (numbers 53–56) for the proper noun. Suitable processing for identifying proper nouns is described in the aforesaid patent application Ser. No. 872,094. Finally, a pointer is set to the last character in the word.

Once these housekeeping tasks are performed, substantive processing of the text word commences at 214 by determining if the word is a hyphenated word or a word concatenated by slashes (such as good/bad). If so Gswds calls the unflection procedure to look up each component of the word in the main dictionary. If all component words are found, a hyphenated word flag is set to true and the XS tag is added to the sentence node. Similarly, at 216, open- and close- parentheses, and dashes are identified and their tags (2, 4 or 6) are added to their sentence nodes, with the "suspect word" flag reset to FALSE. Next, at 218, words consisting entirely of punctuation, such as ". . ." or "—" are identified and an adverbial tag RB is placed in their sentence nodes. This tag is used since adverbs generally do not affect the analysis of tag strings, and thus the flag reflects the transparency of such all-punctuation "words" to grammatical processing. At 220, ordinal numbers are identified and their SEN-NODE modified to include a prenominal indicator with ordinal tag OD (number 61) and corresponding inflectional feature codes.

Similarly, at 222, cardinal numbers are identified and the SEN-NODE loaded with the CD (number 23) tag and agreement features for singular (for "1") or plural (for all other numbers) prenominal features. In addition, sentence initial numeric cardinals as in "67,001 pigeons flew off." are recognized as grammatically improper and a sentence structure error message is set up for display.

For all of the foregoing processing steps, the identification of the stated type of characters is reasonably certain and the "strange word" flag is reset to false.

Next, at 224, acronyms and abbreviations are identified, and are tagged as singular or plural nouns depending on whether a "s" ending is present, with the "proper noun" tag increment added to the common noun tag if the upper case flag is set. For words of length not over two characters the "suspect word" flag is reset to false to keep spelling error messages from being triggered, e.g., for initials during later processing.

Mixed alphanumeric words are identified at step 226, and their SEN-NODES given singular or plural noun tags and features, depending on whether they end in "s". This takes care of alphanumeric names, such as Z80, RS-232 and the like.

Finally, proper nouns are processed at 230. This processing may include recognition of possesives (containing an "'") which would received neutral noun feature agreement codes, and may include other special cases, as appropriate.

Following this preliminary processing, if the text word has not been identified, at 232 the Gswds processor looks the word up in the suffix recognition table, Appendix Al, as described above. For each listed suffix, the table contains a suggested set of tags, nominal inflection codes (if any) and verbal inflection codes (if any). For example, the suffix "ward" is stored together with its characteristic tags for adjectival usage ("homeward voyage") and adverbial usage ("homeward bound"). No nominal or verbal inflections are listed for this suffix.

Thus, at 232, in a first step 234, the processor retrieves this suffix table data. Next, at 236, the retrieved tag data, including noun and verb inflection codes, if any, is copied into the word's SEN NODE.

In this preferred embodiment, the processor also, at 238 creates a "base form" for the de-suffixed word and creates a new entry in the main dictionary, or in the user's special dictionary, with that base form and the retrieved tags and inflectional feature information, setting a SEN-NODE pointer to the new dictionary entry. This allows subsequent grammatical processing and error-message synthesis stages to access this information and synthesize the text word using the same processing employed for words in the existing dictionary.

During this latter state of incorporating the retrieved data in the SEN-NODE and the main dictionary, certain particular processing is done at 240 in various cases according to the retrieved tags. For example, for a possessive singular or plural common noun, processing flags are set to assure that words such as 1900's (or 1900s' respectively) are not identified as spelling errors.

Following the completion of the above processing, at step 242 the suspect word flag is checked, and if it is set ON, the type of error is identified from data set during preceding processing stages. In the prototype system, the types of errors detected, each of which is flagged by an error return from the module which notes the error during its processing, include errors in matching a suffix table entry, spelling errors encountered during the initial look up procedure, failure to identify a component of a hyphenated word, and the like. During stage 242 the type of error is ascertained by inspecting the stored error returns, and an error message keyed to the error type is displayed.

In this manner, the range of text which can be automatically tagged is greatly extended, and text errors are readily corrected by the user at an early stage of grammatical processing.

This completes the detailed description of the operation of the S-WORDS processor, and the word-recognition and annotation processing of text in Gswds, the further prototype embodiment of a word annotation processor.

The foregoing embodiments have been described by way of illustration in part to show the interrelation of the text annotator with various grammatical processing units. However, the invention contemplates other and partial systems for grammatical annotation, the output of which may, for example, include text having tags assigned by a variety of special recognition modules, or a single collocationally-assigned "tag" for each text word; or other output having grammatical information of the text. Related embodiments of systems according to the invention include tag identifying speech/voice transformation systems, preprocessing systems for annotating database text, and selective post-processing database retrieval systems to identify syntactically plausible replacement words, or to sort out or prioritize the display of messages for spelling correction or data retrieval systems.

The invention being thus described, other examples and embodiments of the invention will occur to those skilled in the art, and all such embodiments and examples are within the spirit of the invention, as defined by the following claims.

APPENDIX A
ENCODING OF INFLECTIONS

The GCS main dictionary provides for the encoding of inflectional information. This is done for two main reasons: (1) by encoding inflectional information and having algorithms to (a) analyze inflected forms in order to recover their bases, and (b) synthesize inflected forms from codes associated with their bases, the number of distinct noun and verb forms that need to be stored in the main dictionary may be reduced by a factor of approximately four; and (2) by having access to a full noun or verb paradigm from any one of its members, corrections may be supplied for feature-based errors within a paradigm by an error-free process of straightforward substitution.

Encoding of Nominal Inflections

Regular nouns in English may have up to four forms: (1) singular (computer), (2) singular possessive (computer's), (3) plural (computers) and (4) plural possessive (computers). The noun "computer" is a member of the most common noun paradigm in English, which will be represented here by the suffix complex [0, 's, s s] (with the zero indicating the absence of an ending for the singular (base) form of the noun). This paradigm is referred to in this documentation as "noun class one" and is generally encoded as "N1" (with the GCS-internal representation of '01'B).

Noun class two (encoded as,"N2", with the GCS-internal representation of '10'B) is characterized by the suffix complex, [0, 's, es, es], and includes: (1) words such as "abyss" and "lunch" (which end in a sibilant and thus requires a plural in "as"); and (2) words such as "potato" ad "taxi" (which are required by arbitrary rules of English orthography to end in "es" when put into their plural forms).

As it turns out, some words in class N2 also can take variants from the N1 suffix complex, and vice versa (e.g. both "zeros" and "zeroes" are acceptable plurals of the noun "zero"); this type of variation is handled by encoding these nouns as either "N21" or "N12", depending on which is the generally preferred suffix complex for each variant (the GCS-internal code is correspondingly more complex, and is described below).

Noun class three (encoded as N3, with the GCS-internal representation of '11'B) is characterized by the suffix complex and consists of nouns whose plurals exhibit an "y/ies" alternation with their base forms (generally those nouns with either a penultimate consonant or the "guy" ending, e.g. "try/tires" and "colloquy/Colloquies", as opposed to "day/days", and "buy/buys").

Noun class four (encoded as N4, with the GCS-internal representation of '00'B) is characterized by the suffix complex, and consists of nouns whose singular forms are indistinguishable from their plural forms; e.g., "sheep." A large number of N4 nouns also have plural variants in another noun class; these are encoded as N41 (e.g., "elk/elks"), N42 (e.g., "fish/fishes"), or N43 (e.g., "fry/fries"), respectively.

In one grammar processing apparatus, the dictionary includes for each noun an ordered sequence of code bits which encode particular agreement, "feature or dominance properties, such as number, gender and the like. In a prototype embodiment of the present invention, the bits in positions 12 through 16 of this noun feature string are used to encode inflectional form variants in different classes, as follows: $B_{12-13}$ contains the main inflectional class code and if $B_{14}$ is set, then $B_{15-16}$ contains the alternate inflectional class code. Thus, for example, the value of $B_{12-16}$ for the noun "computer" (N1) is '01000'B; for the noun "domino" (N21) is '10101'B; and for the noun "fish" (N42) is '00110'B.

The above system handles all of the inflectional information for regular nouns with full paradigms; English includes, however, both nouns with defective paradigms (i.e., lacking either a singular or plural form) and nouns with irregular paradigms (i.e., with forms not fitting into the general inflectional patterns described above).

Concerning defective paradigms, nouns lacking plural forms may all be considered members of noun class one, with the plural elements of the suffix complex eliminated (since the differences between the suffix complexes for the four classes described above appear only in their plural forms). This fact may be represented by the suffix complex [0, 's, X,X] (encoded as N1s); examples of words of this type are "advice", "ado", "alertness", etc. Like the regular noun base forms, these irregular noun forms also have codes stored in positions 12 through 16 of the noun feature string (in this case $B_{12-16}$ contains '01001'B).

Nouns lacking singular forms fall into one of two categories; N4p (characterized by the suffix complex [X, X, 0, 's] and N1p (characterized by the suffix complex [X, X, s, s]. Examples of words in class N1p are "people" and "townsfolk", and of words in class N4p are "alms" and "scissors." Like the regular noun base forms, these irregular noun forms also have codes stored in positions 12 through 16 of the noun feature string (in this case $B_{12-16}$ contains '"00010'B for class N4p and '01010'B for class N1p). In both cases, the value of $B_{15-16}$ indicates that the noun has no singular forms, and the value of $B_{12-13}$ indicates which normal paradigm has the correct plural endings for the given defective paradigm (N4 for N4p and N1 for N1p).

Similar to both N4 and N1p is the paradigm corresponding to most nouns ending in "ics" (e.g., "logistics", "gymnastics", etc.). This paradigm may be represented by the suffix complex [s, s', s, s], and is encoded by setting $B_{12-16}$ to '01011'B, which is interpreted as mapping the normal plural suffixed of class N1 onto the singular forms as well; this class receives the special noun class one code of N1x.

| FIG. 28: Examples of Encoding Nominal Inflections |||||
|---|---|---|---|---|
| Word | Tag | EG | $B_{1-9}$ | Base Form | $B_{12-16}$ |
| computer | NN (N1) | 1 | 0-001000 | — | 01000 |
| computer's | NN$ | 4 | 001.0- | computer | 01000 |
| computers | NNS | 1 | 0-001100 | computer | 01000 |
| computers' | NNS$ | 4 | 001.0- | computer | 01000 |
| fish | NN, NNS (N41) | 1 | 0-000-000 | — | 00110 |
| fish's | NN$, NNS$ | 4 | 001.0- | fish | 00110 |
| fishes | NNS | 1 | 0-0011000 | fish | 00110 |
| fishes' | NNS$ | 4 | 001.0- | fish | 00110 |
| man | NN (N41) | 1 | 0-0010000 | — | 01001 |
| man's | NN$ | 4 | 001.0- | man | 01001 |
| men | NNS (N4p) | 1 | 0-0011000 | man | 01001 |

-continued

| FIG. 28: Examples of Encoding Nominal Inflections | | | | | |
|---|---|---|---|---|---|
| Word | Tag | EG | $B_{1-9}$ | Base Form | $B_{12-16}$ |
| men's | NNS$ | 4 | 001.0- | man | 01001 |

Concerning the inflection of the base forms encoded by the system described above, if a given word is possessive form ending in "'s" that has a singular interpretation (thus excluding plural possessives in "'s", like "men's"), then it receives two possible encodings, one as a pre-nominal (feature string '001.0'B,) and the other as a singular noun plus either of the auxiliaries "is" or "has". If the word is any other possessive form, then it receives only the pre-nominal interpretation. If the word is not a possessive form, then the value of $B_{5-6}$ indicates whether it is singular ('10'B), plural ('11'B), or neutral with respect to number agreement ('0-'B). The "neutral" number code is used paradigms such as N4 and N1x, where the singular and plural forms are identical, and thus context dependent (e.g., "the fish is/are . . .").

Concerning the encoding of irregular paradigms (e.g., "man/men" or "knife/knives", where the singular and plural forms are in general not linked by any easily-defined relationship), an efficient way of encoding these irregular paradigms is to consider them as being the union of two defective paradigms, with the singular forms being from class N1s and the plural forms being from class N4p (thus yielding a composite paradigm of the form, "[$R_1$O, $R_1$'s, $R_2$O, $R_2$'s]", where $R_1$ and $R_2$ represent the two irregular roots). These partial paradigms are differentiated from the corresponding defective paradigms by having the first bit of MD-REC.X-FLGS set to '1'B, which indicated that the other half of the paradigm may be recovered from the irregular paradigms; exception dictionary indexed by the root, either $R_1$ or $R_2$, of the half of the paradigm under consideration.

Encoding of Verbal Inflections

Regular verbs in English may have up to four forms: (1) base form (compute), (2) present-tense, third-person singular agreement form (computes), (3) past form (computed), and (4) present participle (computing). These four forms fall into two classes, with the following interpretations: (1) non-finite: (a) infinitive (Form 1), (b) past participle (Form 3), and (c) present participle (Form 4); and (2) finite: (a) present-tense, non-third person singular agreement form (Form 1), (b) present-tense, third-person singular agreement form (Form 2), and (c) past tense form (Form 3). Note that Forms 1 and 3 have both finite and non-finite interpretations, while Form 2 must always be finite and Form 4 must always be non-finite.

The verb "compute" shown above is a member of the most common verb paradigm in English, which will be represented here by the suffix complex [0, s, ed, ing] (with the zero indicating the absence of an ending for the infinitive form of the verb). This paradigm is referred to in this documentation as "verb class one" and is encoded as "V1" (with the GCS-internal representation of '01'B) There are, however, some special classes of endings in verb class one, which may handled by general rules, as follows. If a verb in claim V1 ends in an "e", then the preceding letter must be inspected before the suffix complex may be assigned. If this letter is not an "e", "i", or "o", then the suffix complex [e, es, ed, ing] is used in place of the normal V1 complex (which is [0, s, ed, ing], in effect dropping the "e" before adding "ing." If the penultimate letter is "e" or "o", however (e.g., "agree", "toe"), then the suffix complex is used, and if it is "i", then the special V1 suffix complex [ie, ies, ied, ying] is used.

Verb class two (encoded as "V2", with the GCS-internal representation of '10'B) is characterized by the suffix complex, and includes: (1) words such as "possess" and "lunch" (which end in a sibilant and thus require that their present-tense, third-person singular form end in "es"); and (2) words such "go" and "do" (which are required by arbitrary rules of English orthography to end in "es" when put into their present-tense, third-person singular forms). There are no special rules in verb class two based on the last consonant, although these is a small group of verbs ending in a single "s" or "z" (encoded, as noted below, by class V2d) that exhibits doubling phenomena in all non-base forms.

Verb class three (encoded as V3, with the GCS-internal representation of '11'B) is characterized by the suffix complex [y, ies, ied, ying], and consists of verbs whose present-tense, third-person singular agreement forms exhibit an "y/ies" alternation with their base forms (generally those verbs with a penultimate consonant, e.g., "try/tries" as opposed to "stay/stays", and "buy/buys"). Verb class three has no special rules based on the consonant preceding the "y", though some special processing is necessary in GcsUnfl and GcsInfl to ensure the separation from class V3 the special V1 paradigm noted above that is characterized by the suffix complex (e.g., "belie" and the regular paradigm associated with the word "lie").

Verb class four (encoded as V4, with GCS-internal representation of '00'B) is characterized by the suffix complex [0, s, 0, ing], and consists of verbs whose past forms are indistinguishable from their base forms, e.g., "cost."

In all verb classed except for V3, the basic paradigms described above may be modified by the doubling of the last consonant of the base form before the addition of the ending; base forms of this type receive the special character "d" following their verb inflectional class code, and are interpreted as follows:

Verb class one: V1d encodes the paradigm [0, s, Ded, Ding] (where D indicates the doubling of the consonant preceding the suffix, e.g., "abet, abets, abetted abetting" (there are at present 301 verbs in this sub-class, out of the 4,424 verbs in class V1).

Verb class two: V2d encodes the paradigm. e.g., "quiz, quizzes, quizzed, quizzing" (there are at present 4 verbs in this sub-class, out of the 287 verbs in class V2).

Verb class four: V4d encodes the paradigm, [0, s, 0, Ding], e.g., "cut, cuts, cut, cutting" (there are at present 23 verbs in this sub-class, out of the 33 verbs in class V4).

These special paradigms are encoded by setting a special ($B_{14}$) in the verb base form inflectional code string ($B_{14-16}$).

Partial paradigms are defined as well for verb classes one through three when the second bit, in MD-REC.X-FLGS (which corresponds to the verb's base form) is set to '1'B; in this case the past form is left out of the paradigm and in its place is substituted the form or pair of forms (past tense, past participle) located by reference to the irregular forms' exception dictionary.

One further verb class (encoded as Vix) is reserved for the small number of verbs ending in "-c" that have a paradigm characterized by the suffix complex (e.g., "panic", "traffic", etc.); these verbs have both their past form and their present participle stored in the irregular forms, exception dictionary.

2.2.4. Encoding of Irregular paradigms

As noted above, may paradigms in English are characterized by the occurrence of one or more elements that are not related to the base form of the paradigm in the same way as the majority of similar "regular" forms are. For example, the plural form of the noun "man" is "men" (rather that the "regular" form "mans" - which does, however, occur as the third-person present-tense singular form of the verb "to man") similarly, the past tense form and past participle of the verb "write" are "wrote" and "written", respectively (rather than the "regular" form "writed").

As it turns out, most irregular non paradigms in English have two roots, one for the singular form and one for the plural, and the corresponding possessive form are formed by adding "'s" to each root. Thus an irregular paradigm of this type may be encoded as two parallel lists, the nth element of the first one corresponding to the singular form root and the nth element of the second one corresponding to the plural form root Using this system, the only difference between the procedures of inflecting regular and irregular nouns is the insertion of an addition step in the latter procedure to perform a root substitution (by switching the root reference from the current list to the other one) whenever a form of this type switches from singular to plural or vice versa.

Similarly, most irregular verb paradigms have not more than three roots, one for the base form (which is inflected in a regular manner to obtain the third-person present-tense singular form and the present participle), one for the past tense form, and one for the past participle (if it is not equal to the past tense form). Thus an irregular paradigm of this type may be encoded as three parallel lists, the nth element of the first one corresponding to the base form root, the $n^{th}$ element of the second one corresponding to past tense form root, and the $n^{th}$ element of the third one corresponding to the past participle root. Using this system, the only difference between the procedures of inflecting regular and irregular verbs is the insertion of an additional step in the latter procedure to perform a root substitution (by switching the root reference between the three lists) whenever a form of this type switches between the three root types.

There are, however, more complex paradigms for the verbal auxiliaries; for example, the verb "have" has the irregular third-person present-tense form "has" (as well as the irregular past tense form/past participle "had"), and the verb "be" has an eight-member paradigm that requires distinctions not present in any other verbal paradigm (e.g. number agreement in the past tense to differentiate between the forms "was" and "were"). These irregularities are handled separately, by a special verbal auxiliary processor.

As noted above, however, the large majority of irregular nouns and verbs in English fit into patterns where a small number of roots for each base form may be stored in certain well-defined slots (plural form for nouns; past tense form and past participle for verbs) and then used to generate the full paradigm for each irregular form. The list-oriented method given as an example above describes one possible method of storage for the generation of irregular paradigms - however, its has two major drawbacks.

The first drawback concerns methods of access; if the lists are ordered alphabetically according to base form (or, in general, are in any order that makes it easy to access the elements of one particular list), then it will be difficult to access a base form when given one of its inflected forms (or, in the general case, to access elements of the well-ordered list from any of the other ones), since the inflected-form lists will not be in easily-searched order. Because the GCS programs require both that (a) inflected forms be easily generated from their base forms and (b) base forms be easily recoverable from any of their inflected forms (no matter how irregular), then the ordering of the "lists" of forms in the exception dictionary must be such that one method of access by no more difficult than the other.

The second drawback is that the mappings between the lists described above are neither unique nor one-to-one; words exist in English which are: (a) irregular inflected forms that are also the base forms of regular paradigms (e.g., "found" is the irregular past tense form/past participle of the verb "find", but is also a regular noun and verb base form in its own right); (b) irregular inflected forms that are also the base for of irregular paradigms (e.g., "was" is the irregular past tense form of the verb "see", but is also the base form of the irregular paradigm including the past participle "sawn", a well as being a regular noun base form); (c) irregular base forms that are also past tense forms in their own paradigms (e.g., "beat", with the past tense form "beat" and the past participle "beaten"; (d) irregular base forms that are also past participles in their own paradigms (e.g., "come", with the past participle "come" and the past tense form "came"); and (e) base forms that have both regular and irregular paradigms (e.g., "lie" has the irregular past tense form "lay" and past participle "lain" for its meaning "to lie (down)" and the regular past tense form/past participle "lied" for its meaning "to tell a falsehood"). The existence of words of the above types means that, in order to determine all usages of a given word, all three lists may have to be searched.

Both of the above problems may be eliminated by constructing a more sophisticated storage representation than the parallel lists described above. The first step is to store all grammatical information for both regular and irregular forms in the lexicon with the irregular forms differentiated by a special flag. This flag would be keyed to the specific irregular element within a given word's tag string; e.g., if the flag is encoded as "±{irr.}", than the word "beat" would have a tag string representable as: "N1(−{irr.}) V1(+{irr.}) VBD(+{irr.}) JJ(−{irr.})" (indicating that the noun and adjective forms are not irregular and that the verb base and past tense forms are irregular). Similarly, the word "foot" would have a tag string representable as: "N1(+{irr.}) V1(−{irr.})" (indicating that the noun base form is irregular and the verb base form is not), and the word "lie" would have a tag string representable as: "N1(+{irr.}V1()V1(+{irr.}) V1(−{irr.})" (indicating that the noun base form is regular and that there are two verb base form interpretations, one that is regular and one that is not). The actual internal representation used in the GCS main dictionary is somewhat different in form from the particular notation presented above, but it is (in general) conceptually equivalent; the important idea is that "+{irr.}" feature serves to indicate that further processing is necessary to recover the other elements of a given word's paradigm, and that this processing is a straightforward search for linked nodes, since all other grammatical information is stored on the given word's main dictionary record.

APPENDIX A1 to U.S. patent application for WORD ANNOTATION SYSTEM of inventors KUCERA et al.

SUFFIX RECOGNITION TABLE

```
/*---------------------------------------------------------------*
*                                                                 *
* COPYRIGHT (c) Houghton Mifflin Company Grammar Correction System. *
* This work is protected by the United States Copyright Laws as an *
* unpublished work and by Houghton Mifflin as trade secret information. *
* Solely for use in licensee software as permitted by written license *
* from Houghton Mifflin. Disclosure of contents and of embodied *
* programs or algorithms prohibited.                              *
*                                                                 *
*-----------------------------------------------------------------*

*-----------------------------------------------------------------*
*                                                                 *
*       Gsfxtab.c - suffix recognition table for Gswds            *
*                                                                 *
*-----------------------------------------------------------------*
*

Description:
                This is a table of suffixes for Gswds to check in
                determining which tag(s) to assign words not found
                in GCS database.
------------------------------------------------------------------

/*      suffixes and corresponding tag(s)           */
SUFTAB FAR Gsfxtab[] =
        {
        "ble",JJ,ZERO,ZERO,ZERO,
        "age",NN,N1,ZERO,ZERO,
        "ages",NNS,N1,ZERO,ZERO,
        "al",(JJ + NN),N1,ZERO,ZERO,
        "als",NNS,N1,ZERO,ZERO,
        "an",(JJ + NN),N1,ZERO,ZERO,
        "ans",NNS,N1,ZERO,ZERO,
        "ant",NN,N1,ZERO,ZERO,
        "ants",NNS,N1,ZERO,ZERO,
        "ate",(VBI + JJ + VBP + NN),N1,U1,ZERO,
        "ated",(VBD + VBN + JJ),ZERO,U1,ZERO,
        "ating",(VBG + NN + JJ),N1,U1,ZERO,
        "ates",XS,N1,U1,ZERO,
        "ation",NN,N1,ZERO,ZERO,
        "ations",NNS,N1,ZERO,ZERO,
        "dom",NN,N1,ZERO,ZERO,
        "doms",NNS,N1,ZERO,ZERO,
        "ee",NN,N1,ZERO,ZERO,
        "ees",NNS,N1,ZERO,ZERO,
        "eer",NN,N1,ZERO,ZERO,
        "eers",NNS,N1,ZERO,ZERO,
        "ster",NN,N1,ZERO,ZERO,
        "sters",NNS,N1,ZERO,ZERO,
        "er",(RBR + JJR + NN),N1,ZERO,ZERO,
        "ers",NNS,N1,ZERO,ZERO,
        "ese",(JJ + NN),N4,ZERO,ZERO,
        "esque",JJ,ZERO,ZERO,ZERO,
        "less",JJ,ZERO,ZERO,ZERO,
        "ness",NN,N2,ZERO,ZERO,
        "nesses",NNS,N2,ZERO,ZERO,
        "est",(JJT + RBT),ZERO,ZERO,ZERO,
        "ette",NN,N1,ZERO,ZERO,
        "ettes",NNS,N1,ZERO,ZERO,
```

```
"fashion",RB,ZERO,ZERO,ZERO,
"fold",(JJ + RB),ZERO,ZERO,ZERO,
"ful",(JJ + NN),N1,ZERO,ZERO,
"fuls",NNS,N1,ZERO,ZERO,
"hood",NN,N1,ZERO,ZERO,
"hoods",NNS,N1,ZERO,ZERO,
"ics",NNX,N4s,ZERO,ZERO,
"ic",(JJ + NN),N1,ZERO,ZERO,
"fy",(VBI + VBP),ZERO,V3,ZERO,
"fies",VBZ,ZERO,V3,ZERO,
"ish",(JJ + NN),N1,ZERO,ZERO,
"ism",NN,N1,ZERO,ZERO,
"isms",NNS,N1,ZERO,ZERO,
"ist",(JJ + NN),N1,ZERO,ZERO,
"ists",NNS,N1,ZERO,ZERO,
"ite",(JJ + NN),N1,ZERO,ZERO,
"ites",NNS,N1,ZERO,ZERO,
"ize",(VBI + VBP),ZERO,V1,8,
"ized",(VBD + VBN + JJ),ZERO,V1,8,
"izing",(VBG + NN + JJ),N1,V1,8,
"izes",XS,N1,V1,8,
"ity",NN,N3,ZERO,ZERO,
"ities",NNS,N3,ZERO,ZERO,
"ive",JJ,ZERO,ZERO,ZERO,
"let",NN,N1,ZERO,ZERO,
"lets",NNS,N1,ZERO,ZERO,
"like",JJ,ZERO,ZERO,ZERO,
"ying",(VBG + NN + JJ),N1,V3,ZERO,
"sing",(VBG + NN + JJ),N1,V2,ZERO,
"xing",(VBG + NN + JJ),N1,V2,ZERO,
"zing",(VBG + NN + JJ),N1,V2,ZERO,
"ching",(VBG + NN + JJ),N1,V2,ZERO,
"shing",(VBG + NN + JJ),N1,V2,ZERO,
"ing",(VBG + NN + JJ),N1,V1,ZERO,
"ings",NNS,N1,ZERO,ZERO,
"ly",(JJ + RB),ZERO,ZERO,ZERO,
"ment",NN,N1,ZERO,ZERO,
"ments",NNS,N1,ZERO,ZERO,
"or",NN,N1,ZERO,ZERO,
"ors",NNS,N1,ZERO,ZERO,
"ous",JJ,ZERO,ZERO,ZERO,
"cy",NN,N3,ZERO,ZERO,
"cies",NNS,N3,ZERO,ZERO,
"ry",(JJ + NN),N3,ZERO,ZERO,
"aries",NNS,N3,ZERO,ZERO,
"ories",NNS,N3,ZERO,ZERO,
"ries",(NNS + VBZ),N3,V3,ZERO,
"ship",NN,N1,ZERO,ZERO,
"ships",NNS,N1,ZERO,ZERO,
"some",JJ,ZERO,ZERO,ZERO,
"style",RB,ZERO,ZERO,ZERO,
"ward",(JJ + RB),ZERO,ZERO,ZERO,
"wards",RB,ZERO,ZERO,ZERO,
"wise",(JJ + RB),ZERO,ZERO,7,
"-oriented",(JJ + RB),ZERO,ZERO,ZERO,
"-orientated",(JJ + RB),ZERO,ZERO,ZERO,
"shed",(VBD + VBN + JJ),ZERO,V2,ZERO,
"ched",(VBD + VBN + JJ),ZERO,V2,ZERO,
"zed",(VBD + VBN + JJ),ZERO,V2,ZERO,
"xed",(VBD + VBN + JJ),ZERO,V2,ZERO,
"sed",(VBD + VBN + JJ),ZERO,V2,ZERO,
"ied",(VBD + VBN + JJ),ZERO,V3,ZERO,
"ed",(VBD + VBN + JJ),ZERO,V1,ZERO,
"ss",(JJ + NN),N2,ZERO,ZERO,
```

```
"y",(JJ + NN),N3,V3,ZERO,
"x",NN,N2,ZERO,ZERO,
"z",NN,N2,ZERO,ZERO,
"ch",NN,N2,ZERO,ZERO,
"sh",NN,N2,ZERO,ZERO,
"ss",NNS,N2,ZERO,ZERO,
"ses",XS,N2,V2,ZERO,
"xes",XS,N2,V2,ZERO,
"zes",XS,N2,V2,ZERO,
"chs",NNS,N2,ZERO,ZERO,
"ches",XS,N2,V2,ZERO,
"shs",NNS,N2,ZERO,ZERO,
"shes",XS,N2,V2,ZERO,
"ies",XS,N3,V3,ZERO,
"ses\'",NNSpos,N2,ZERO,ZERO,
"xes\'",NNSpos,N2,ZERO,ZERO,
"zes\'",NNSpos,N2,ZERO,ZERO,
"ches\'",NNSpos,N2,ZERO,ZERO,
"shes\'",NNSpos,N2,ZERO,ZERO,
"ies\'",NNSpos,N3,ZERO,ZERO,
"s\'",NNSpos,N1,ZERO,ZERO,
"x\'s",NNpos,N2,ZERO,ZERO,
"z\'s",NNpos,N2,ZERO,ZERO,
"s\'s",NNpos,N2,ZERO,ZERO,
"ch\'s",NNpos,N2,ZERO,ZERO,
"sh\'s",NNpos,N2,ZERO,ZERO,
"y\'s",NNpos,N3,ZERO,ZERO,
"\'s",NNpos,N1,ZERO,ZERO,
"s",XS,N1,V1,ZERO,
"-",JJ,ZERO,ZERO,ZERO
```

What is claimed is:

1. Apparatus for annotating digitally encoded natural language text words, such apparatus comprising
    a dictionary database including a plurality of encoded word base forms, wherein a base form is stored together with a first set of data encoding the possible uses or features of words corresponding to the base form, and with a second set of data encoding the synthesis of inflections of the base form,
    look-up means for identifying a base form of a text word, such look-up means including
        (i) means for detecting a characteristic inflectional ending occurring in the text word to produce a candidate base form, and
        (ii) means for determining whether the candidate base form is a word base form in the dictionary data base, and in that event assigning data stored with the base form to the text word, and
    means for assigning a dummy base form and a set of data codes to a word for which the look-up means retrieves no base form from the dictionary database.

2. Apparatus according to claim 1, further comprising grammatical processing means, operative on digitally encoded text words and on the first and second sets of data codes thereof for determining a parse of a sentence.

3. Apparatus according to claim 1, further comprising matching means, for detecting when a word is approximately identical to an inflection of a base form but differs therefrom, and
    error means, for displaying an error message associated with the difference.

4. Apparatus for annotating digitally encoded natural language text words, such apparatus comprising
    a dictionary database including a plurality of word records, each record including a set of tags indicative of properties of a word
    look up means for looking up a text word in the dictionary database and retrieving its set of tags when the text word is identified in the dictionary database, and
    morphological analyzer means, operative on a text word which is not identified in the dictionary database, for determining a set of tags and dummy base form by inspection of the morphology or context of such word.

5. Apparatus according to claim 4, further comprising grammatical processing means, operative on digitally encoded text words and on the tags for determining a parse of a sentence of the text.

6. Apparatus according to claim 4, wherein the morphological analyzer means comprises
    means for identifying a text word which is derived from a word having a dictionary base form by a process of suffixation.

7. Apparatus according to claim 4, wherein the morphological analyzer means comprises
    means for identifying an idiomatic expression.

8. Apparatus according to claim 4, wherein the morphological analyzer means comprises
    means for identifying a word consisting of a permissible literal-numeric combination.

9. Apparatus according to claim 4, wherein the morphological analyzer means comprises
    means for recognizing a characteristic inflectional portion of a text word and for assigning thereto a provisional base form and provisional tags.

10. Apparatus according to claim 9, wherein the morphological analyzer means comprises
    means for creating a word record including said provisional base form and provisional tags.

11. Apparatus according to claim 4, wherein the morphological analyzer means comprises
    means for identifying a text word which is derived from a word having a dictionary base form by a process of prefixation.

12. Apparatus according to claim 4, wherein the morphological analyzer means includes
    a stored table of word endings wherein the class of words having such ending is characterized by corresponding tags, each such ending being stored with its corresponding tags, and
    means for looking up endings of a text word in said stored table and retrieving the tags corresponding to a said ending found in the table.

13. Apparatus according to claim 12, wherein the morphological analyzer means further includes means for identifying certain classes of words by inspection of character types prior to looking up endings of unidentified words in said table.

14. Apparatus according to claim 13, wherein said means for identifying by inspection of character types includes means for identifying at least one of abbreviations, proper nouns, cardinals, ordinals and alphanumeric names.

* * * * *

UNITED STATES PATENT AND TRADEMARK OFFICE
CERTIFICATE OF CORRECTION

PATENT NO. : 4,864,501
DATED : September 5, 1989
INVENTOR(S) : Kucera et al.

It is certified that error appears in the above-identified patent and that said Letters Patent is hereby corrected as shown below:

Column 11, line 19, delete "t its" and insert --to its--.

Column 21, line 24, delete "(computers)" and insert --(computers')--.

Column 21, line 26, delete "[0, 's, s s]" and insert --[0, 's, s, s']--.

Column 21, line 34, delete "[0, 's, es, es]" and insert --[0, 's, es, es']--.

UNITED STATES PATENT AND TRADEMARK OFFICE
CERTIFICATE OF CORRECTION

PATENT NO. : 4,864,501
DATED : September 5, 1989
INVENTOR(S) : Kucera et al.

It is certified that error appears in the above-identified patent and that said Letters Patent is hereby corrected as shown below:

Column 21, line 36, delete ""as"" and insert --"es"--.

Column 21, line 50, after "complex" insert --[y, y's, ies, ies']--.

Column 21, line 53, delete ""try/tires"" and insert --"try/tries"--.

Column 22, line 32, delete "[X, X, s, s]" and insert --[X, X, s, s']--.

Column 22, line 37, delete ""'00010'B" and insert --'00010'B--.

Column 22, line 46, delete "[s, s', s, s]" and insert --[s, s', s, s']--.

UNITED STATES PATENT AND TRADEMARK OFFICE
CERTIFICATE OF CORRECTION

PATENT NO. : 4,864,501

DATED : September 5, 1989

INVENTOR(S) : Kucera et al.

It is certified that error appears in the above-identified patent and that said Letters Patent is hereby corrected as shown below:

Column 22, line 48, delete "suffixed" and insert --suffixes--.

Column 24, line 18, delete "these" and insert --there--.

Column 25, line 27, before "Using" insert --.--.

Column 25, line 34, delete "not" and insert --no--.

Column 26, line 18, delete "by" and insert --be--.

Column 26, line 27, delete ""was"" and insert --"saw"--.

Column 26, line 30, delete "a well as" and insert --as well as--.

UNITED STATES PATENT AND TRADEMARK OFFICE
CERTIFICATE OF CORRECTION

PATENT NO. : 4,864,501

DATED : September 5, 1989

INVENTOR(S) : Kucera et al.

It is certified that error appears in the above-identified patent and that said Letters Patent is hereby corrected as shown below:

Column 26, line 62, delete ""N1(+{irr.}V1{)V1(+{irr.}) V1(-{irr.})" and insert --"N1(+{irr.}) V1(+{irr.}) V1(-{irr.})"--.

Signed and Sealed this

Twenty-fifth Day of February, 1992

Attest:

HARRY F. MANBECK, JR.

*Attesting Officer*     *Commissioner of Patents and Trademarks*